May 7, 1940.    W. M. CARROLL    2,199,480
LIQUID DISPENSING APPARATUS
Filed Jan. 31, 1936    12 Sheets-Sheet 1
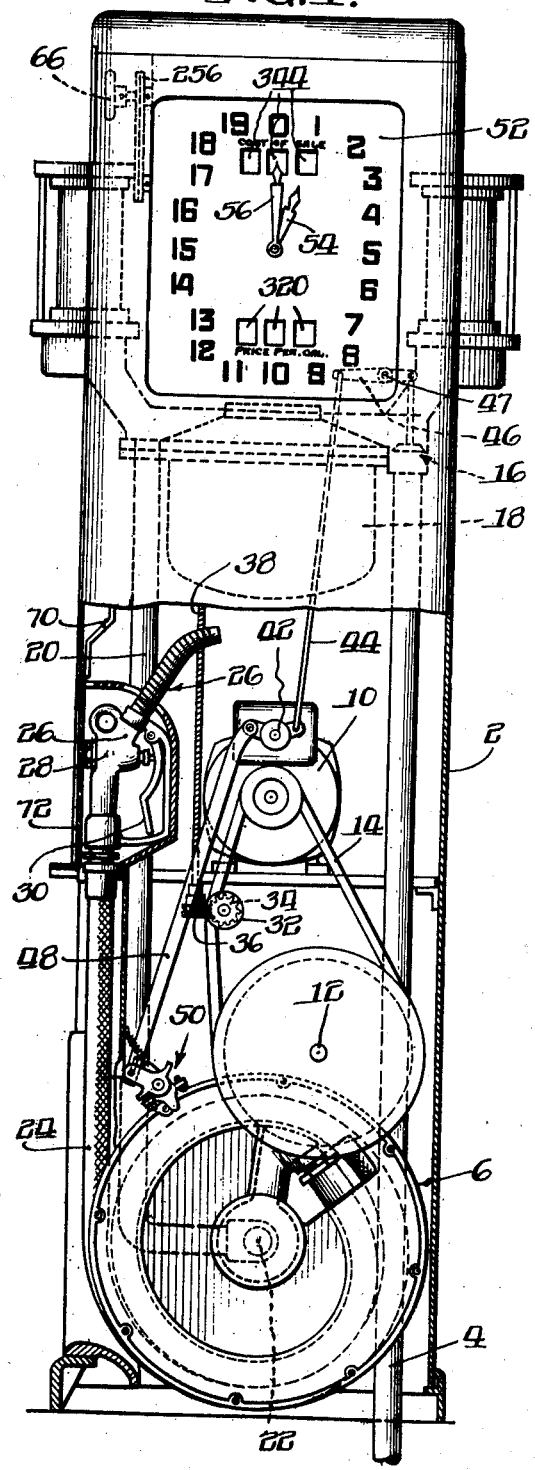
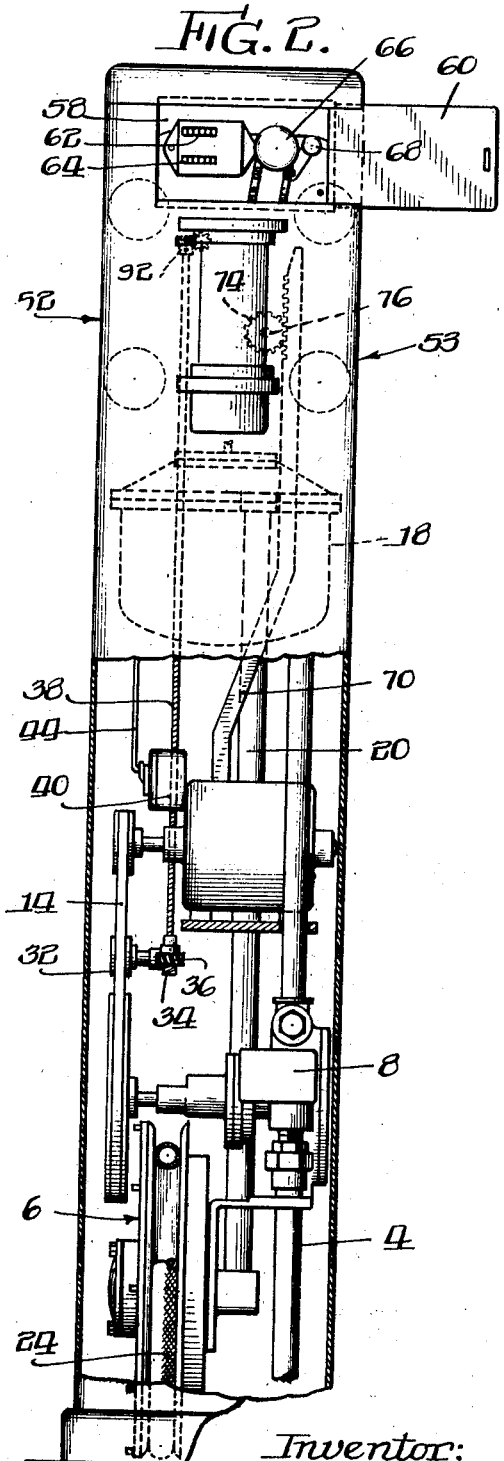
Inventor:
William M. Carroll
By: Cox & Moore attys

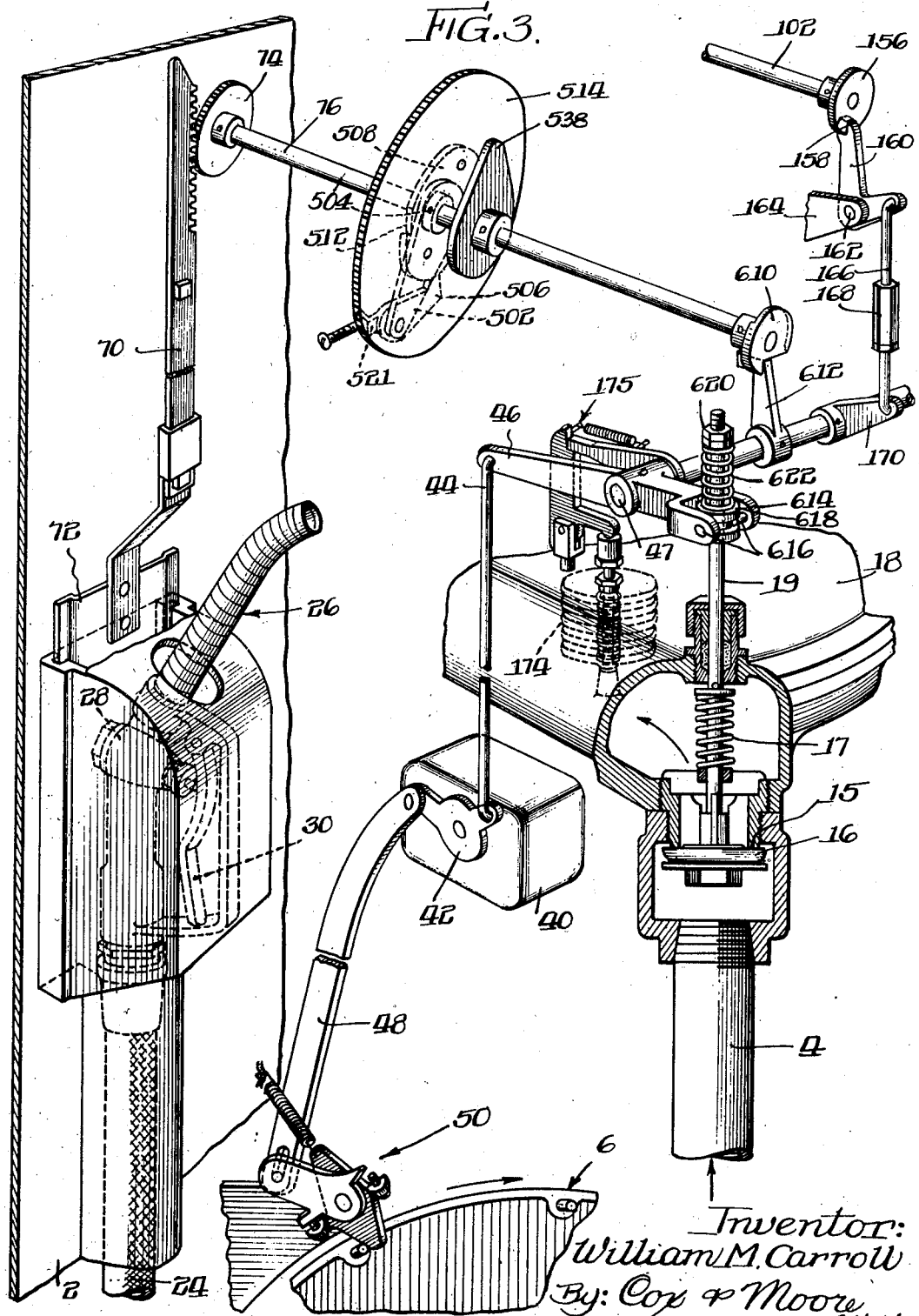

May 7, 1940.  W. M. CARROLL  2,199,480
LIQUID DISPENSING APPARATUS
Filed Jan. 31, 1936   12 Sheets-Sheet 3
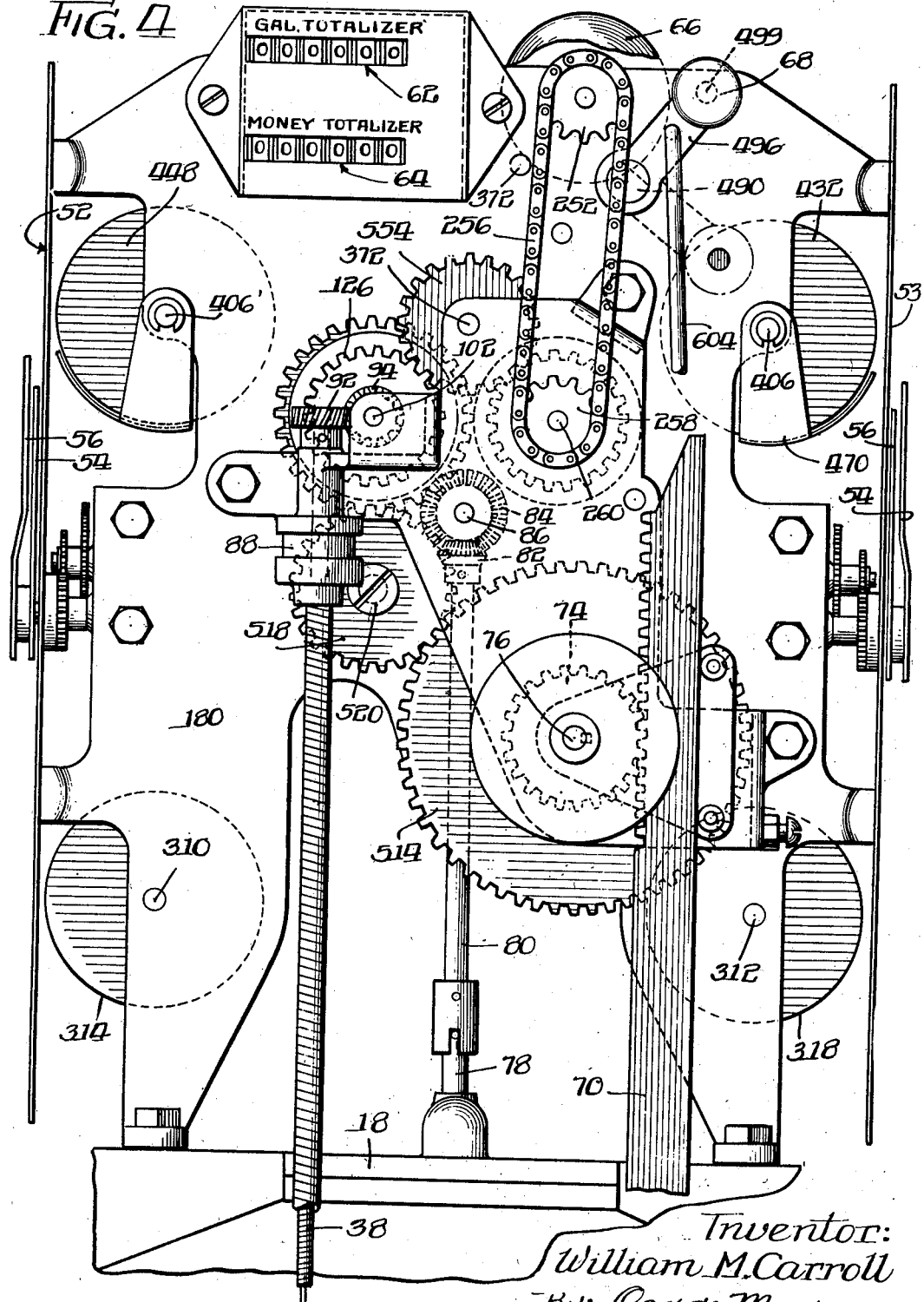
Inventor:
William M. Carroll
By: Cox & Moore attys

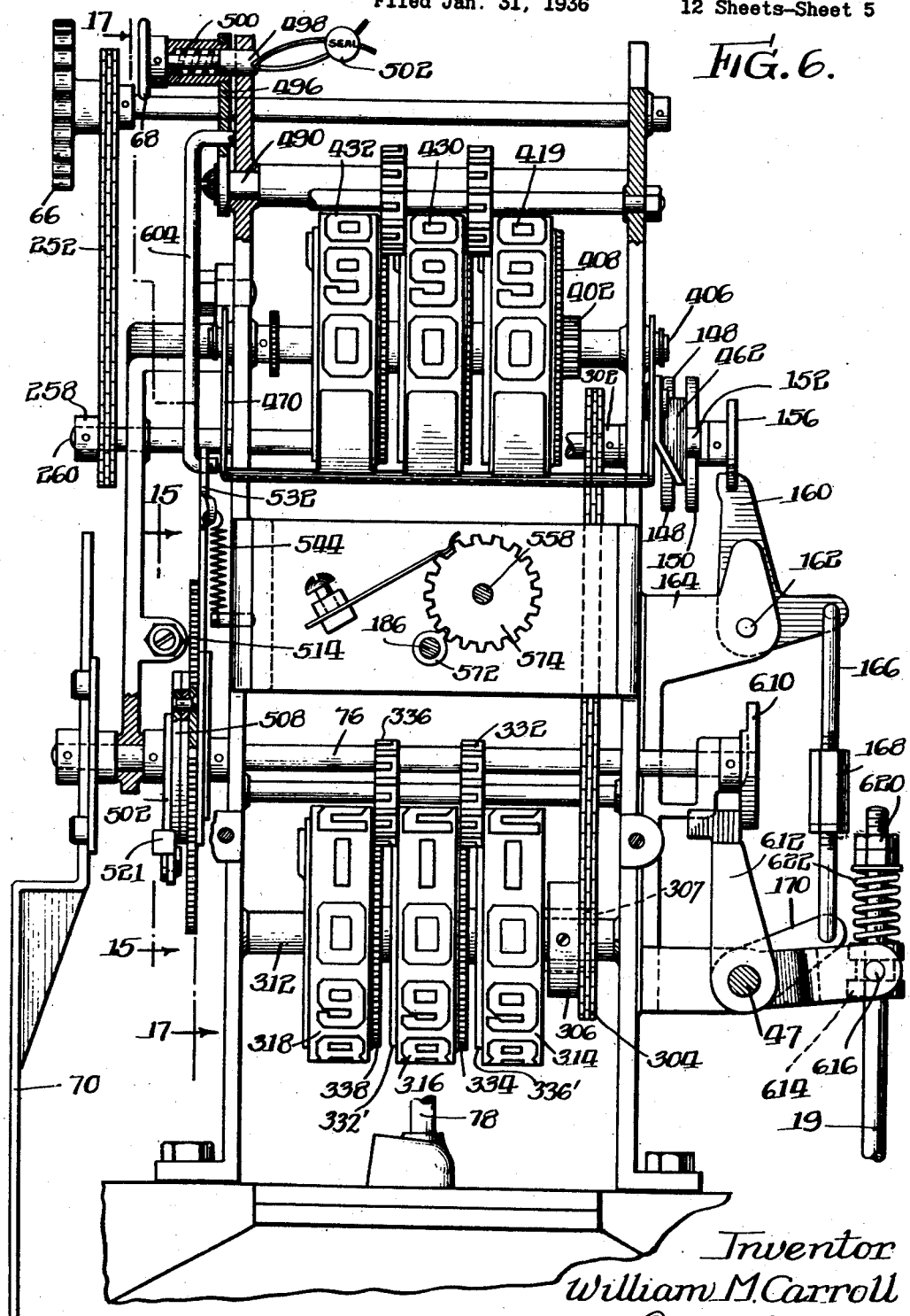

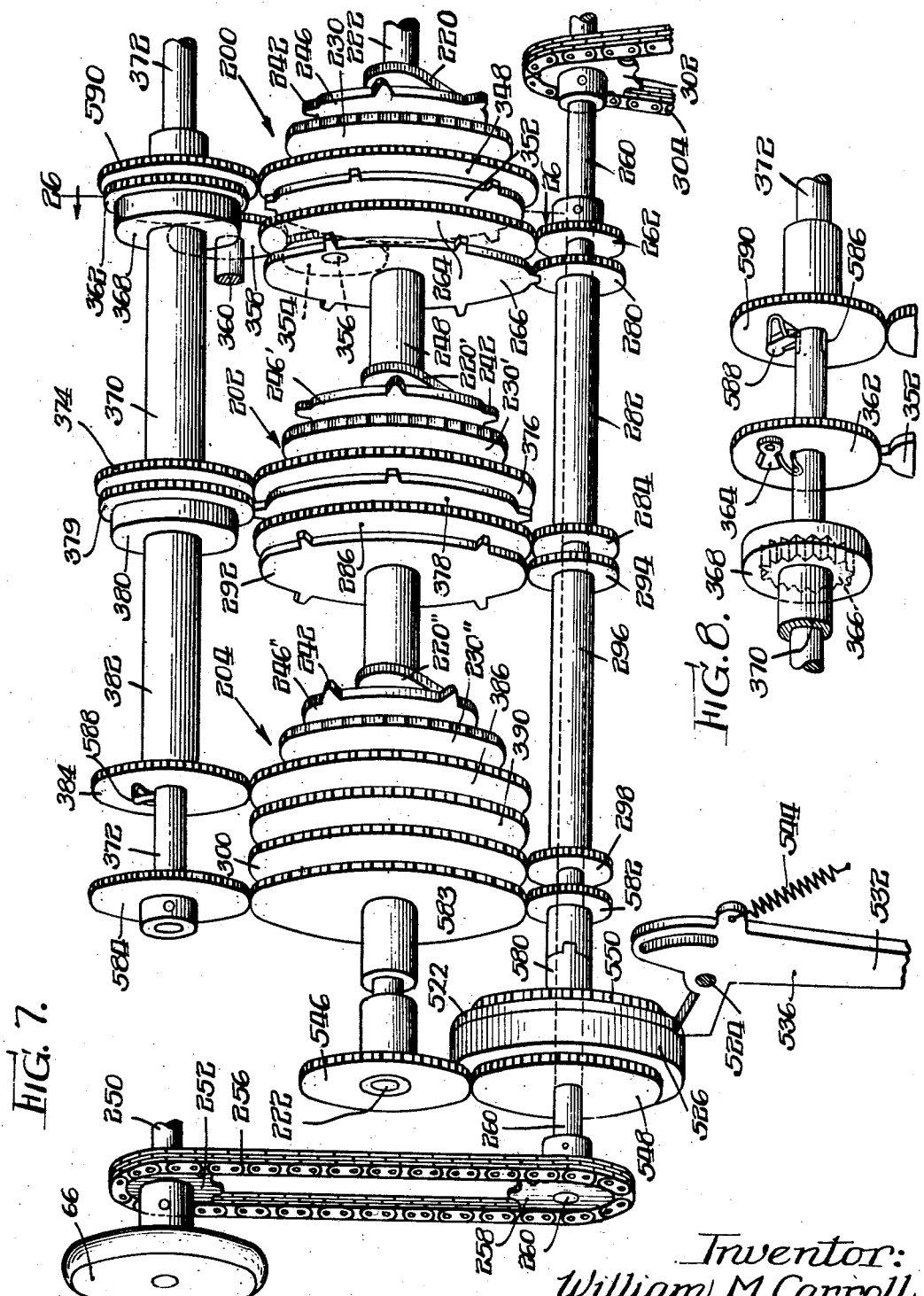

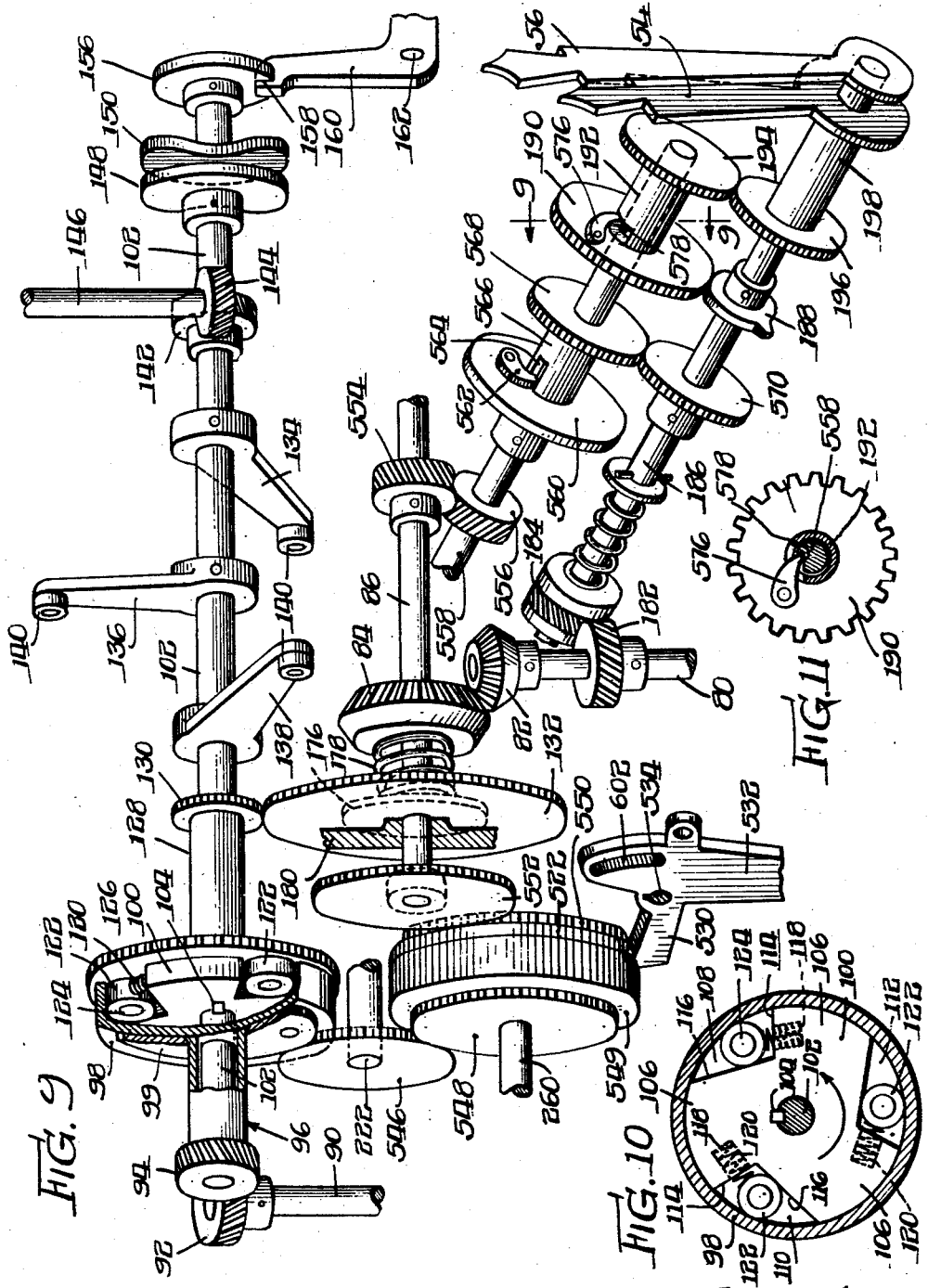

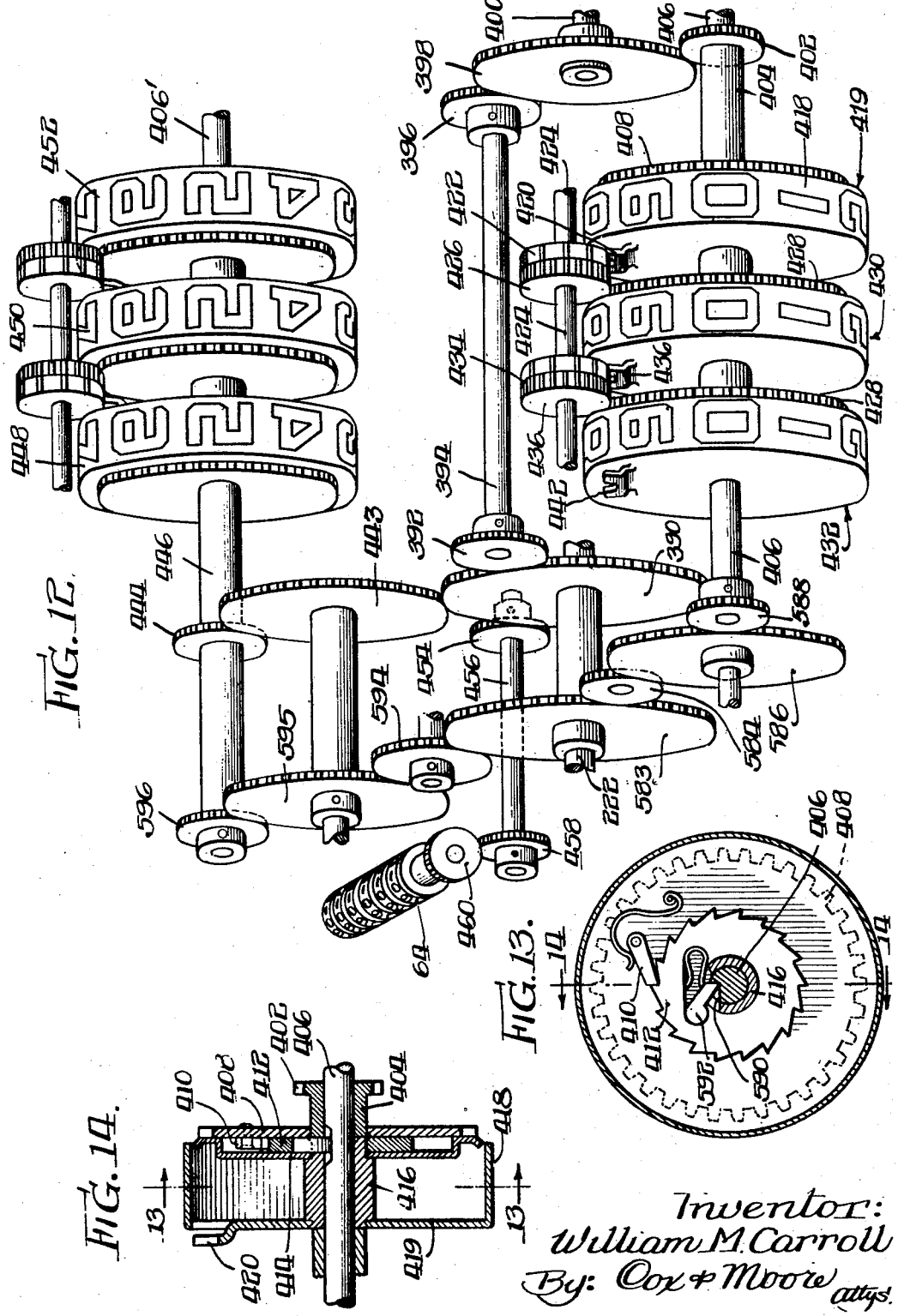

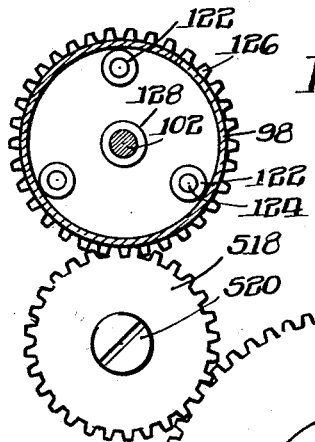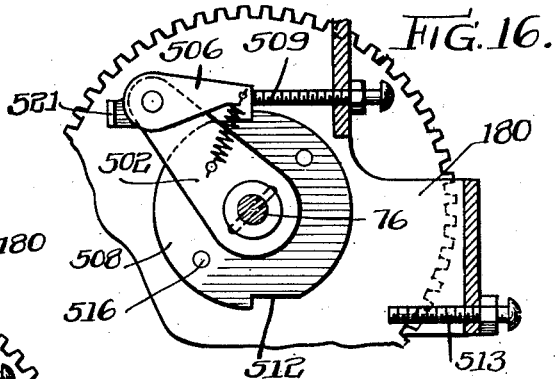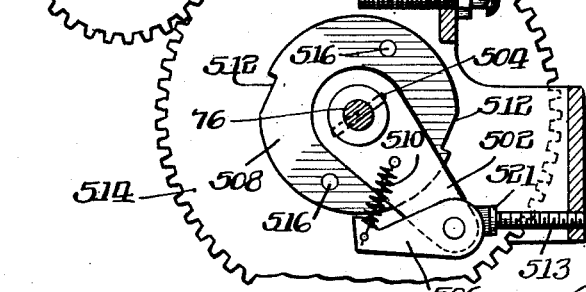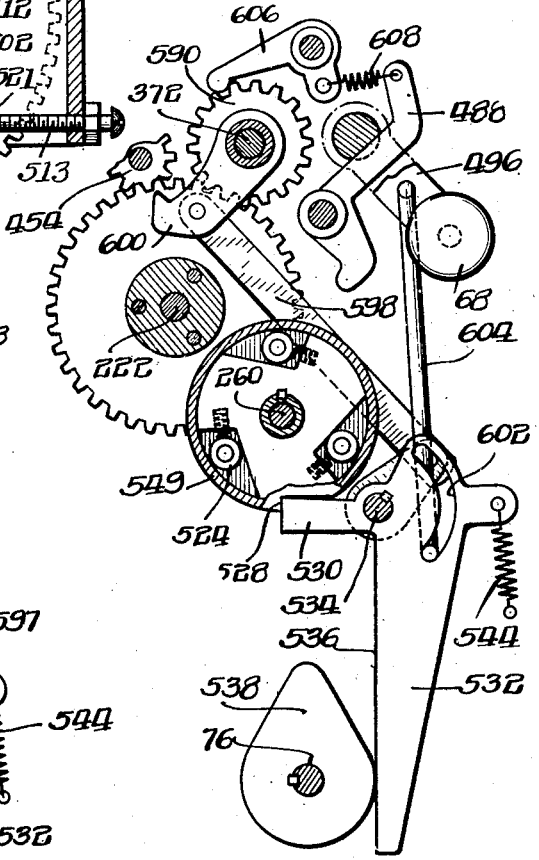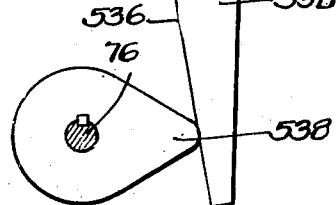

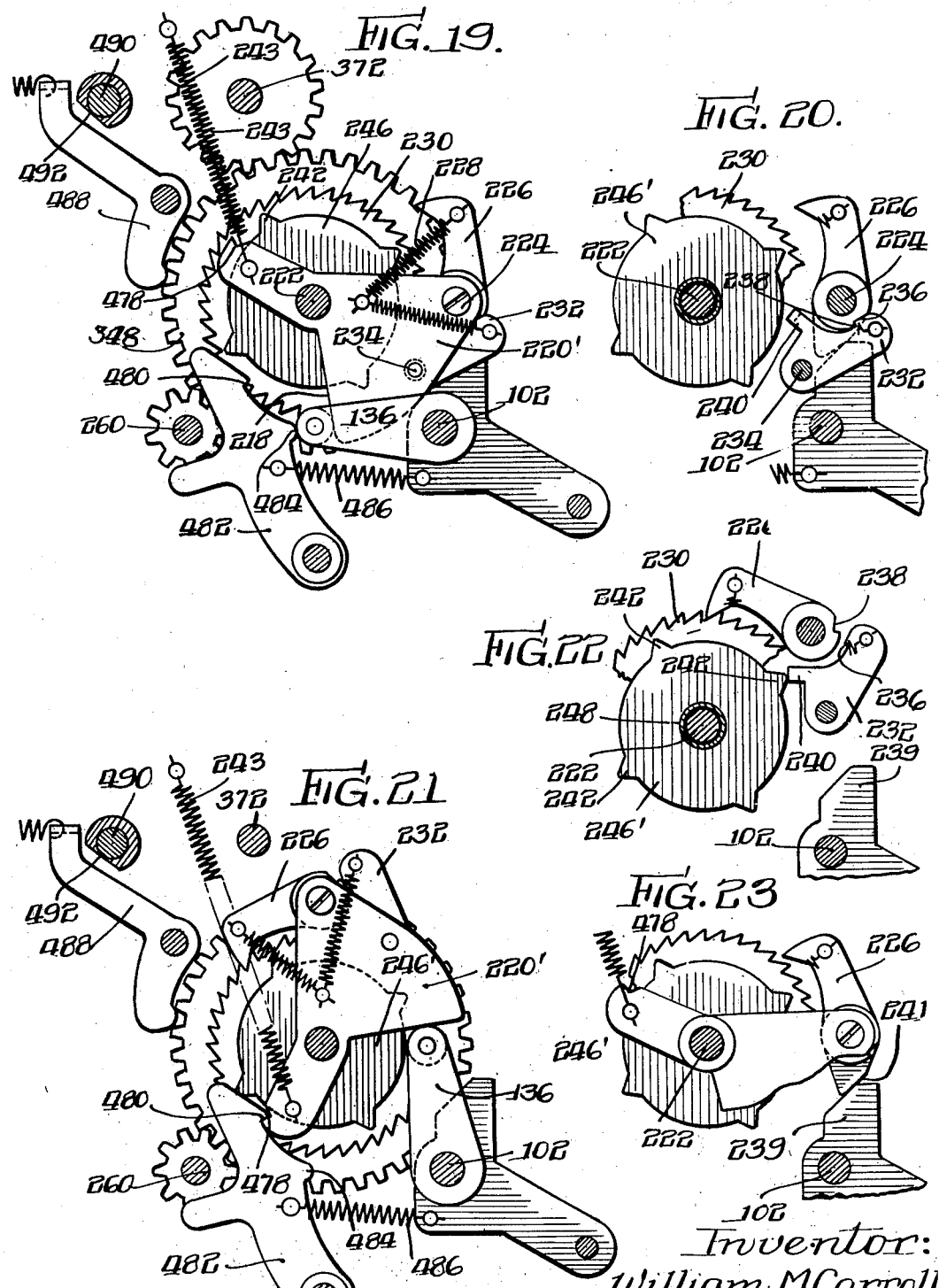

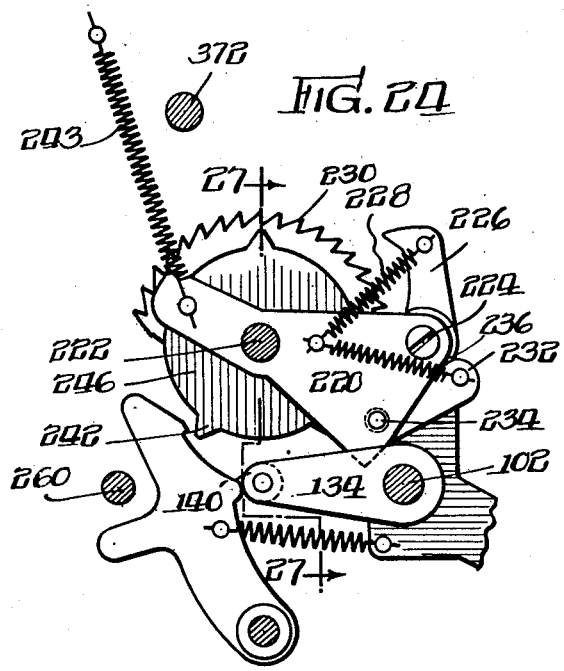
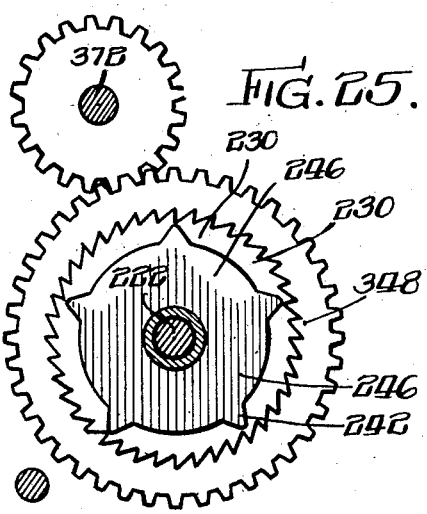
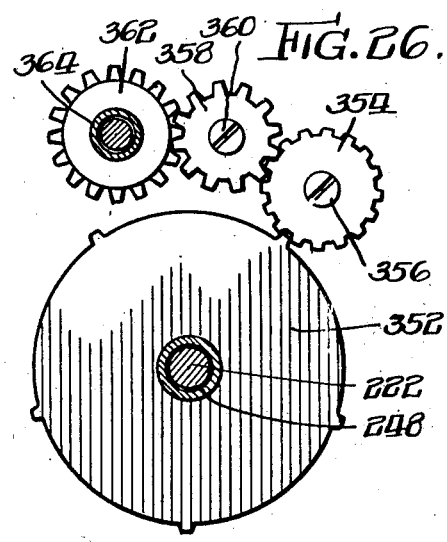
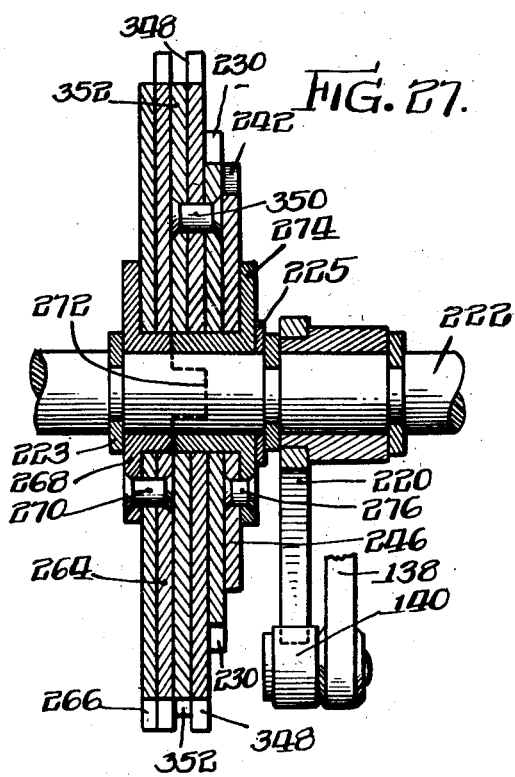

May 7, 1940. W. M. CARROLL 2,199,480
LIQUID DISPENSING APPARATUS
Filed Jan. 31, 1936 12 Sheets-Sheet 12
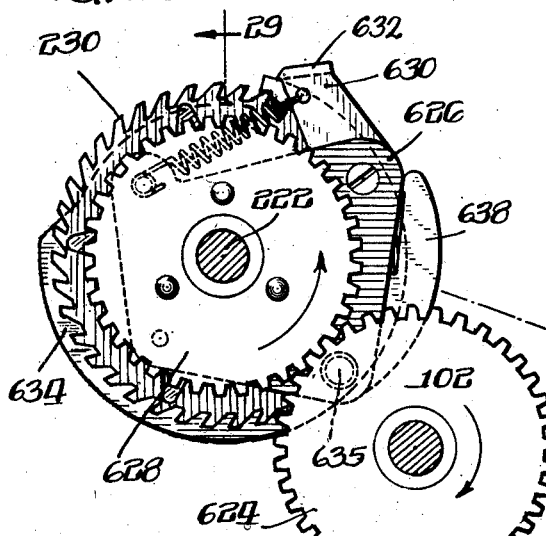
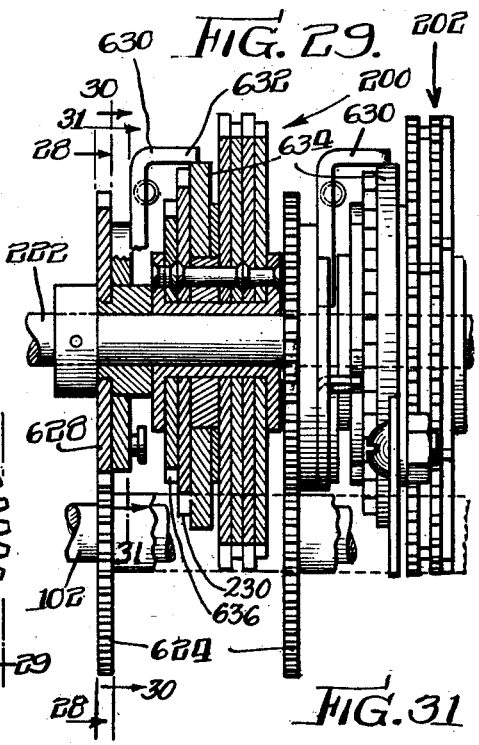
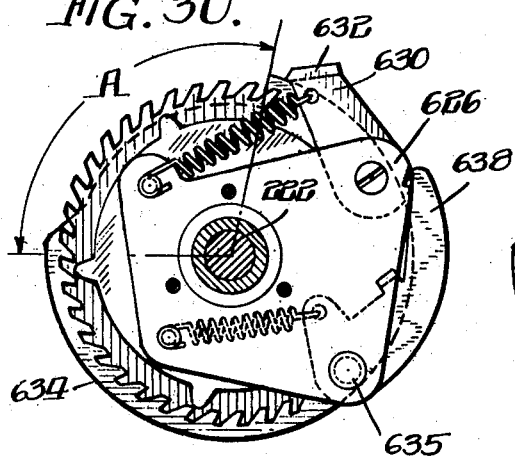
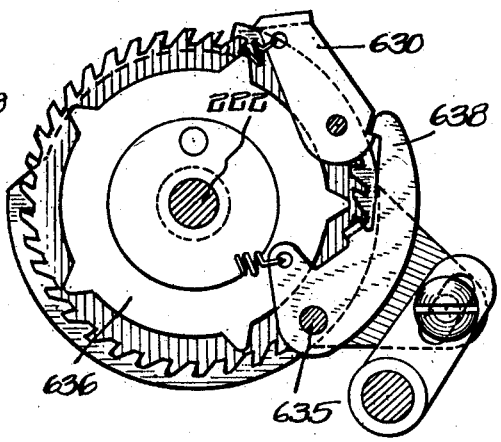
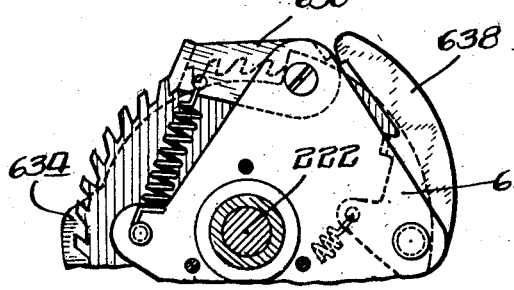
Inventor
William M. Carroll
By: Cox & Moore
attys.

Patented May 7, 1940

REISSUED
OCT 6 1942

2,199,480

UNITED STATES PATENT OFFICE 2,199,480

LIQUID DISPENSING APPARATUS

William M. Carroll, Fort Wayne, Ind., assignor to S. F. Bowser & Company, Inc., Fort Wayne, Ind., a corporation of Indiana Application January 31, 1936, Serial No. 61,731

17 Claims. (Cl. 221—95)

This invention relates to a liquid dispensing device of a computing type and particularly to gasoline dispensing pumps having an indicating device, preferably a clock dial, wherein means is provided for not only indicating the liquid dispensed in the customary units, such as gallons or fractions of gallons such as quarts, but wherein there is also provided an associated means for indicating the cost of the sale based on gallons sold and integral quarts sold.

Other objects of this invention are to provide means to indicate the total cost based upon a price per gallon unit cost, said price being computed by a quart register, to provide means for indicating the cost of the gallons dispensed based upon a unit price per gallon, the price being calculated upon the corresponding price per quart and the liquid being dispensed in quart increments, the dispensing, computing and indicating being selectively terminable at any desired quart after dispensing has begun.

Yet another object of my invention is to provide a computing pump which may be preconditioned by a desired manual operation after dispensing has been initiated, which will automatically cause the dispensing to stop irrespective of the closing of the nozzle valve when a predetermined definite number of quarts have been dispensed and the total cost of the quarts at a predetermined price per quart thus dispensed will be computed and indicated.

Yet another object of my invention is to provide a register and computing mechanism which is adapted to compute cost based on quart dispensing regardless of whether the unit price upon which the computation is made is in cents and tenths of a cent per gallon or in cents and fourths of a cent per gallon.

Yet another object of my invention is to provide a register particularly adapted to compute in quart increments the total cost based on unit price of either tenths or fourths of a cent per gallon.

Yet another object of this invention is to provide a price indicating mechanism wherein the price per gallon may be changed by a single manual adjustment which will automatically compel the computing mechanism to compute the value of the gasoline dispensed in the adjusted price change.

Yet another object of my invention resides in providing a mechanism wherein the computing mechanism is rendered inoperative, preferably locked, during the time the price change is being made.

Yet another object of my invention resides in providing a resetting mechanism for the clock or computing mechanism wherein the function of placing the dispensing nozzle on its stationary support and maintaining it thereon conditions a prime mover, preferably the pump motor, for subsequently automatically resetting the computing mechanism upon the initiation of a subsequent dispensing operation and whereby this automatic power operated resetting is accomplished at the initial operation of the pump motor and before the operator has time to start the flow of gasoline through the dispensing line.

Yet another object of my invention resides in providing in a specific construction of resetting as accomplished by a hose reel construction type of pump wherein the initial outward movement of the hose from the hose reel will cause the automatic operation of the pump motor which primarily will effect resetting prior to the sufficient withdrawal of the hose and the nozzle from its reel, as would be accomplished in ordinary dispensing.

Yet another object of my invention is to provide a hose reel control which upon the initial extension of the hose starts the dispensing motor and effects resetting prior to the time the nozzle assumes its operative position with respect to the tank to be filled and the operator has time to open the nozzle.

Yet another object of my invention is to provide a register mechanism, the various orders of which are based upon different increments of movement.

These and other objects of my invention will be apparent from a perusal of the following specification when taken in connection with the following drawings.

Referring now to the drawings in detail:

Fig. 1 shows a front elevational view of a pump, preferably a gasoline pump, provided with one form of my improved price-calculator, the lower portion of the housing being shown broken away in detail.

Fig. 2 is a side elevational view of a pump with the lower portion broken away.

Fig. 3 is a perspective view of the hose reel control mechanism in connection with the meter valve and the reset mechanism.

Fig. 4 is a view of the computing clock and calculator assembly, the same being a side elevation.

Fig. 6 is a sectional view taken on line 6—6 of Fig. 5 of the calculator and clock assembly.

Figure 5:
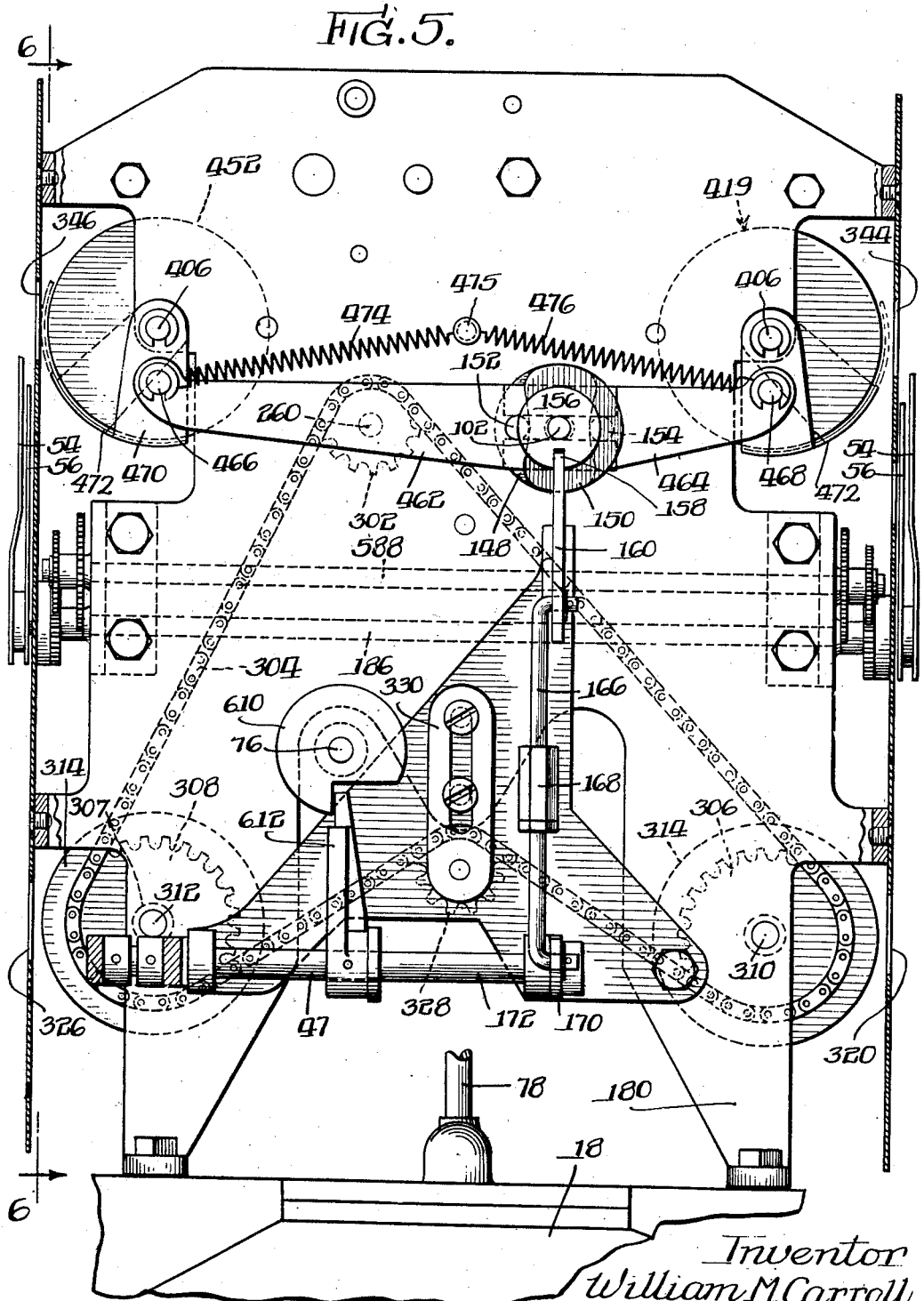
Fig. 5 is an opposite side elevation of the clock and calculator assembly.

Fig. 7 is an expanded diagrammatic perspective view of the price calculating mechanism.

Fig. 8 is an expanded detail view of the transfer gearing.

Fig. 9 is a diagrammatic perspective view of the motor and meter driving mechanism.

Fig. 10 is a sectional view of the rotor clutch.

Fig. 11 is a section taken on line 11—11 of Fig. 9.

Fig. 12 is a view showing the gearing for operation of total sale dials.

Fig. 13 is a sectional detail view of one of the total sale dials being taken on line 13—13 of Fig. 14.

Fig. 14 is a sectional view of the total sales dial taken on line 14—14 of Fig. 13.

Fig. 15 is a sectional view taken on line 15—15 of Fig. 6 showing a portion of the reset mechanism.

Fig. 16 is a changed position of the parts as shown in Fig. 15.

Fig. 17 is a sectional view taken on line 17—17 of Fig. 6 showing a portion of the resetting mechanism.

Fig. 18 is a changed position of the parts shown in Fig. 17.

Figs. 19, 20, 21, 22, 23, 24, 25 and 26 are detail figures showing the operation of the price calculating mechanism.

Fig. 27 is a sectional view taken on line 27—27 of Fig. 24.

Figs. 28, 29, 30, 31 and 32 are views showing the modifying price calculating mechanism.

In my improved form of computing pump I have preferred to show the computing pump in conjunction with a drum or reel type of dispenser disclosed in my pending application, Serial No. 22,287, filed May 20, 1935. It is, however, distinctly understood that this is merely illustrative and that my computing pump may be utilized with any conventional type of dispenser of the present day use, and particularly with the present type of dispenser wherein the liquid is pumped through a flow line which includes a meter, and wherein the meter terminates in a flexible hose provided with a valve control nozzle, and wherein the nozzle assembly when not in use is supported on a hook or other support on the outside of the housing, which hook has an associated mechanism for controlling the motor pump and also for locking the motor pump and the nozzle valve in inoperative position when not in use.

In the illustrated embodiment of my invention I have shown a housing providing an upstanding casing 2, housing a portion of the liquid flow line 4 which at its lower end is adapted for connection with a source of liquid. In this illustrated embodiment, as in my prior application above mentioned, the lower portion of the housing is designed to enclose a hose reel 6, a pump 8, a motor 10 for driving the pump shaft 12 by means of a belt connection 14. The upper portion of the liquid flow line 4 is provided with a control valve 16 operable as hereinafter set forth. This valve governs the flow of the liquid from the flow line 4 into the meter 18, which is preferably of the liquid displacement type and is of any desired construction. I prefer, however, to use the present type of Bowser meter now on the market.

The meter discharge is provided in the form of a pipe 20 which connects to the central portions 22 of the hose reel 6, all as illustrated and claimed in my prior application Serial No. 22,287, aforesaid. From the central connecting pipe 22 the liquid will flow through the flexible hose 24 coiled on the reel, and thence out through a discharge nozzle 26 provided with a control valve 28 having a manually operable valve control lever 30. Inasmuch as the details of the hose reel and its manner of operation are described and claimed in my prior application, no further reference will be made except as to those parts which it will be necessary to describe for an understanding of the present invention.

In the present instance, the belt 14 from the motor 10 to the pump pulley on the pump shaft 12 also operates to drive a smaller pulley 32 carrying the gear 34, which in turn meshes with another gear 36 on a flexible shaft 38, so that when the pump is operated this flexible shaft 38 will be rotated.

A switch box 40 is provided in conjunction with the motor 10 and a shiftable switch mechanism 42 includes a rod 44 operably connected by means of a lever 46 to the valve control shaft 47 and an additional lever 48 is operably connected to latching mechanism 50, which in turn is operated by the hose reel 6 in the general manner set forth in my prior application Serial No. 22,287, aforesaid.

The upper portion of the housing, and preferably above the meter 18, provides room for my improved price computing mechanism including oppositely disposed clock faces 52 and 53. Each of these clock faces is provided with a series of numbers ranging from 0 to 19 and disposed substantially concentrically about a pair of hands, including a small gallon-indicating hand 54 and a larger indicating hand 56. The small hand will move one-twentieth (1/20) of a complete revolution in indicating a gallon and the large hand will make a complete revolution on the indication of a single gallon. Therefore, the large hand in a movement from 0 to 1 will indicate 1/20 of a gallon. In addition, each dial 52 and 53 is provided with three openings disposed preferably just over the zero figure on the dial and three additional openings just above the figure 10 on the dial. The upper series of three openings is arranged to indicate the cost of sale and the lower openings are arranged to indicate the price per gallon.

Furthermore, by reference to Fig. 2, the upper side of the housing 2 is provided with an opening 58 which is provided with a slidable closure 60, which may be manually opened to display a gallon totalizer 62 and a money or price totalizer 64. This door 60 also gives access to the price-setting control knob 66, and also a knob 68 for locking the price-setting mechanism so that the latter cannot be changed during computing and dispensing. In addition, the housing encloses a rack 70, preferably operated from the door 72, which controls the placing of the nozzle 26 on its stationary support, as preferably shown in my prior application Serial No. 22,287. The rack 70 is adapted to actuate a gear 74 fixed to a reset shaft 76, as will be hereinafter set forth. The resetting mechanism of my present invention in some particulars differs from that shown in my prior application Serial No. 22,287, and such improvements will be claimed in this present application.

The meter 18 is provided with an extension meter shaft 78 provided with a detachable extension 80, driving a bevel gear 82 meshing with another bevel gear 84 on a shaft 86 (see Fig. 9). The flexible shaft 38, shown in Fig. 4, terminates in a bearing 88, where it is then connected to a shaft 90 having a spiral gear 92 adapted to actuate another spiral gear 94 fixed on a sleeve 96 and rotatable on the shaft 102, see Fig. 9.

The invention of this computing mechanism embodies certain principles disclosed in my prior application, Serial No. 9,760, filed March 7, 1935, but differs therefrom in generic and specific objects of invention and constructional features and operation whereby greatly improved computing functions are secured.

Referring now to Fig. 9, it will be understood that the pump driven shaft 90 is driven at all times that the pump is in operation. It is also understood that the meter extension shaft 80 is driven only when the meter is in operation, in short, when dispensing is taking place. Sleeve 96 is connected to a cup-shaped clutch housing 98. Within this clutch housing is disposed a clutch member 100, which is keyed to a shaft 102 as by a key 104. As shown clearly in Fig. 10, the clutch member 100 is provided with three radially extending equi-distantly spaced arms 106, forming therebetween three angularly shaped pockets 108, 110 and 112. One wall of each of these pockets comprises a face 114, the other wall of each pocket comprises the face 116, which is disposed at slightly more than a right angle to the face 114. The face 116 is considerably longer than face 114. In the face 114 of each pocket is provided a recess 118 in which is located a coil spring 120 which normally presses against rollers 122 disposed within each pocket. The springs 120 constantly force the rollers into contact with the circular inner wall of the clutch housing 98 and against the oppositely inclining wall face 116 of the pocket. These rollers are each carried on roller shafts 124, mounted upon the face of a gear 126, which is connected to one end of a sleeve 128 carrying on its opposite end a small gear 130 meshing with a larger gear 132, loosely mounted on the cross shaft 86. Mounted on the shaft 102 are three radially disposed arms 134, 136 and 138, the same being rigidly fastened thereto by pins or other devices. Each of these arms carries a roller 140 thereupon. These arms are spaced apart angularly on the shaft 102, 120 degrees apart. In addition, the shaft 102 carries a gear 142 fixed thereto, meshing with another gear 144, to drive the gallon-totalizer shaft 146, hereinafter referred to. This shaft 146 operates in the well-known manner, the gallon-totalizer 62. In addition, the shaft 102 is provided with two cams 148 and 150, each being adapted to actuate pins 152, 154 (see Fig. 5) as hereinafter more fully set forth. The shaft 102 which revolves once for each quart or other unit dispensed, in addition is provided with a notched disc 156, having a notch 158 into which cooperates with an index finger 160. As shown in Fig. 3, this index finger comprises an angle lever pivoted at 162 on a stationary support 164 and is operated by means of a rod 166, having an adjustable connection 168 with a lever 170, which lever is mounted on the valve control 47 upon which the lever 46 is also rigidly mounted, the lever at 46 being shown in Fig. 1 and also in Fig. 3. This lever 46 is operated to cause the opening of the control valve 16 and is actuated by means of the hose reel on a starting movement, and is also actuated by the spring 17 of the control valve when the Sylphon 174 operates the unlatching mechanism 175 to permit the spring 17 to urge the valve 16 to closed position, all as set forth in my prior application Serial No. 22,287.

It will thus be seen that in the present instance when the Sylphon is snapped from the nozzle valve lever, as in my prior application Serial No. 22,287, the valve 16 can only close when the index finger 160 registers with the notch 158 in the quart or other unit notched disc 156. Thus the valve will only completely close when a quart, which in the present instance is the minimum unit to be computed, has been dispensed. It will be understood the snap of the Sylphon will condition the finger 160 so that it presses against the imperforate portion of the disc 156 and is ready to fall into the notch 158 when the notch registers with index finger 160, so that the Sylphon may be operated just ahead of the one quart unit and when the quart has been dispensed the notch 158 will register and the index finger 160 will then move under the urge of the spring 17 to permit the valve 16 to close entirely, thereby ceasing the dispensing operation at exactly one quart unit. During this same time the complete units have been computed and indicated on the computing mechanism of the clock.

Referring now again to Fig. 9, the gear 132 is frictionally driven by the meter shaft 80 through spiral gears 82 and 84 and a friction disc 176, which is pressed by means of spring 178 against the side face of the gear 132, the other face of the gear 132 presses against the stationary portion of frame 180. Gear 132 will drive gear 130 to drive sleeve 128 which in turn will drive gear 126 which in turn will drive the rollers 122 in a planetary movement. Simultaneously therewith the pump shaft will drive the cup-shaped housing 98. A differential of movement between the member 126 which carries the rollers 122 and the cup-shaped housing 98 will serve to carry the rollers into wedging engagement between the faces 116 and the inner circular surface of the cup-shaped housing 98, whereby to cause movement of the member 100, which member being keyed by means of key 104 to the shaft 102, drives the shaft 102 at this differential speed whereby to revolve the computer actuating arms 134, 136 and 138.

In addition, the shaft 80 is provided with a gear 182 which drives gear 184 loosely mounted on shaft 186 but which drives said shaft by means of a well known friction clutch mechanism. Shaft 186, at its outer ends is provided with the fast indicating clock hand 56. In addition, the shaft 186 is provided with a stub tooth gear 188 fast thereto, which drives a full tooth gear 190, which in turn carries a sleeve 192 having at its opposite end another gear 194. This gear 194 meshes with gear 196 mounted on a sleeve 198 which has fixed to it at its opposite end a slowing moving hand 54. It will be understood that this drive, shown in Fig. 9, is duplicated at the opposite side of the clock mechanism.

Referring now to the computing mechanism shown in Fig. 7 which is an expanded perspective view of the associated parts and also to Figs. 19 to 27, inclusive, it will be understood that this computing mechanism comprises three sets of counter assemblies, each similar to one another but not identical with each other. These three counter assemblies 200, 202 and 204, see Fig. 7, are arranged on the shaft 222 and co-operate with each other to compute the price of the amount of liquid flowing through the meter and also having necessary mechanism for setting the price per gallon, and mechanism for returning them to an initial position after the dispensing operation, which will be referred to later.

Referring now to the construction and operation of the counter assembly and transfer mechanism it will be understood that each set of counter wheels 200, 202 and 204 are driven by their respective arms 134, 136 and 138, mounted on shaft 102. Each of these arms 134, 136 and 138 are adapted to co-operate with an actuator arm 220, 220' and 220" to operate counters 200, 202 and 204, respectively. The arms 134, 136 and 138 and their corresponding rollers revolve in the path of the actuator arms 220, 220' and 220". The rollers 140 of the arms engage the radially extending faces 218 of the actuator arms (see Figs. 19 and 24) pivotally mounted on the shaft 222 and drive them through a certain arc or number of degrees. The actuator arm in the 200 counter wheel assembly is driven 72 degrees while the actuator arms in the 202 and 204 counter wheel assemblies are driven 90 degrees, as shown in Figs. 19 and 24, respectively.

Each actuator arm 220 is provided with a pivotal pin 224 on which is pivotally mounted a pawl 226 under tension of a spring 228, so as to normally pull the pawl toward a ratchet gear 230, rotatably mounted on shaft 222. Pawl 226 is held out of engagement with the ratchet teeth 230 by means of a locking pawl 232 pivotally mounted on a pin 234 on the actuator 220. The locking pawl 232 is provided with a shoulder 236, adapted to engage a notch 238 on the hub of the pawl 226 so that when so engaged, as shown in Fig. 20, the pawl 226 will be held in inoperative position but when released the pawl 226, under tension of the spring 228, will engage the rachet teeth 230. In addition, the locking pawl 232 is provided with an ear 240 adapted to be actuated by means of lobes 242 on lobe discs 246, 246' and 246". These lobes 242 are spaced equi-distantly around the periphery of the discs 246, 246' and 246". There are five of these lobes spaced 72 degrees apart on the disc 246 and four of these lobes spaced 90 degrees apart on the discs 246' and 246". Due to the fact that the rollers 140 on arm 134 (see Fig. 24) engage the actuator arm 220 only 72 degrees of its 360 degrees of travel, five lobes are necessary on the lobe disc 246 spaced 72 degrees apart. The rollers on the other two arms, 136 and 138 (see Fig. 19), engage the actuator arms 220 only 90 degrees of their 360 degrees of travel, four lobes are only necessary on the lobe discs 246' and 246".

These lobes 242 are set in position to correspond to the price per gallon. This is accomplished by means of a price-setting knob 66 which upon turning rotates shaft 250, see Fig. 7, which in turn turns the sprocket 252 to move the chain 256, which in turn engages the sprocket 258, mounted on the shaft 260.

This shaft has pinned to it a gear 262 (see Fig. 7) engaging a large gear 264, and this large gear is fastened to a five tooth Geneva gear 266 (see Fig. 27) which is fastened to a sleeve 268 by means of a pin 270. This sleeve 268 is provided with a tongue and groove detachable clutch connection 272 and the flange of this sleeve 274, which carries a pin 276, whereby it is originally mounted to a lobe-carrying disc 246. The gear 266 is adapted to mesh with a small completely toothed gear 280 mounted on a sleeve 282 (see Fig. 7). On the other end of the sleeve is mounted another small gear 284 meshing with a larger gear 286, which forms a part of another group of gears of the same construction, as shown in Fig. 27.

Referring again now to Fig. 7, and particularly to gear 286, which is connected to a four tooth Geneva gear 292 which Geneva gear in turn rotates the small gear 294 on a sleeve 296 similar in all respects to sleeve 282 and having a like function. This sleeve 296 in turn is connected to gear 298 which in turn drives a large gear 300. Just as gear 264 is connected to its lobe disc 246 and just as gear 286 is connected to its lobe disc 246', so also gear 300 is connected to its lobe disc 246" and thus through the turning of knob 66 and the hereinbefore described chain of interconnections, when knob 66 is turned the various lobe discs 246, 246' and 246" are adjustably rotated and this adjustable rotation serves to position each lobe disc with respect to the lug 240 on each locking pawl 232, whereby to determine the position and at what time the pawl 226 will be released from the position shown in Fig. 20 to the position shown in Fig. 22 so that the pawl in its counter-clockwise movement will actuate the ratchet wheel 230.

On the same shaft 260 that is turned by the price-setting knob 66 there is a sprocket 302 over which runs a chain 304 which runs over two larger sprockets 306 and 308, and over a tightening sprocket 328. The sprocket 306 is fast to a sleeve 307 mounted on a shaft 310, which sleeve has fixed to it a dial 314 having on its peripheral face figures 1 to 9, indicating tenths of a cent. Next to the dial 314 is another dial 316 also carrying figures from 0 to 9, which is the cent dial, and next to this is still another dial 318 carrying figures from 0 to 9 which is the 10 cent dial. These dials are duplicated upon the shaft 312 on the opposite side of the pump. The dials on the shaft 310 are viewable through windows 320, on one side of the machine and dials on shaft 312 are viewable through window 326 on the other side of the machine. Through Geneva mechanism comprising the Geneva gear 332 driving the full gear 334, the second dial 316 is driven, and this in turn through another Geneva gear 336 driving the full gear 338 in turn drives the cent dial 318, whereby the price per gallon is set by turning control knob 66. The elements 322' and 336' are Geneva pinions which are driven by dials 314 and 316 respectively to operate the Geneva gears 332 and 336.

The means for indicating the cost of sale is shown clearly in Figs. 1 and 5. By reference to these figures it will be seen that the upper portion of the dial of the clock face is supplied with three windows immediately below zero on the clock face. These windows 320 are duplicated at 346 on the opposite sides of the clock face.

Referring now to the computing mechanism, it will be noted that the ratchet 230 (see Fig. 27) is fastened to the 40 tooth gear 348 (see Figs. 24 and 27) by means of a pin 350, also fast to this gear is a five short tooth Geneva gear 352. This Geneva gear 352 engages a smaller short tooth gear 354 (see Fig. 26) on the shaft 356 and the gear 354 in turn engages another gear 358 on the shaft 360, which gear engages gear 362.

Referring to Fig. 8, gear 362 has pivotally mounted on its side a spring pressed pawl 364 which engages an internal ratchet 366 formed on the enlarged hub 368 of a sleeve 370 loosely mounted on a shaft 372. The other end of sleeve 370 carries rigidly therewith another gear 374 meshing with a gear 376 in the second bank 202. The gear 376 is connected with a four short tooth Geneva gear 378 in the same manner as gear 348 is connected to gear 352 hereinbefore described in connection with the first bank of actuators.

Geneva gear 378 in turn operatively meshes with gear 379 which is similar in construction with gear 362 in the first bank except that it has 20 short teeth. Thus, gear 379 drives through a spring pressed pawl like that as shown in Fig. 8 and an internal ratchet to drive the enlarged hub 380 on sleeve 382. The opposite end of sleeve 382 carries rigidly a gear 384 meshing with gear 386 in a third bank 204, which gear 386 corresponds in construction to gear 376 and gear 348. Gear 386, therefore, acquires the total accumulation of the first two banks and also accumulates the amount registered on the third bank, due to the movement of ratchet 230'', which operates in the same manner as ratchet 230 of the first bank and ratchet 230' of the second bank. The total accumulation of the three banks is carried forward on gear 390 which is secured to the accumulation gear 386. By reference to Fig. 12 it will be seen that gear 390 connects with two parallelly arranged train of gears for driving two sets of price indicators disposed on opposite clock faces. For instance, the gear 390 drives a smaller gear 392 fixed on shaft 394, the opposite end of which carries gear 396 driving a larger gear 398 on a shaft 400 which in turn drives a small gear 402 on a sleeve 404 mounted on the dial shaft 406.

By reference to Figs. 13 and 14, rotation of the sleeve 404 has connected at its opposite end a gear 408 carrying a spring pressed pawl 410 engaging a ratchet wheel 412. The ratchet 412 is fixed to the side wall 414 of a dial assemby 415. This ratchet 412 and side wall 414 are fixed to a sleeve 416, loosely mounted on the shaft 406, which sleeve in turn has attached thereto and adapted to rotate therewith a one cent dial 418, having on its peripheral face figures indicating 1 cent to 9 cents. From the side wall 419 of the dial 418 there are two teeth 420 which engage a Geneva gear 422 loosely mounted on shaft 424. Attached to this Geneva gear and rotating with it is a full tooth gear 426 which engages a larger gear 428 of the 10 cent dial assembly. This dial assembly 430 is driven in the same manner as the preceding dial assembly and has figures on its peripheral face to indicate 10 cents to 90 cents, and in like manner the third dial assembly 432 is driven by a Geneva mechanism 434 controlled by the struck-out teeth 436 on the side of the dial 430. This last dial has figures on its peripheral face which indicate $1.00 to $9.00.

The dial 432 is shown as carrying on its side punched out tooth 442 which is not used in the present instance but the construction is shown since it facilitates the manufacture of interchangeable dials, because each dial assembly is a self-contained unit.

In a similar manner, the gear 390 drives a gear 443 meshing with a smaller gear 444 on a sleeve 446 which is similar to sleeve 404 herein described, and which in turn drives the opposite bank of price indicating dials 448, 450 and 452.

In addition, the gear 390 drives a smaller gear 454 on a shaft 456 which has fastened thereto a spiral gear 458 driving another gear 460 which in turn operates a price totalizer 64, shown in Fig. 4, as projected through a window.

By reference to Figs. 5, 6 and 9, it will be noted two cams 148 and 150 are carried on shaft 102 engaging pins 152 and 154, respectively. The pin 152 is mounted on an arm 462 and pin 154 is mounted on an arm 464. Each one of these arms is provided at its inner end with a bifurcation providing registering and opposed slots and each arm just at the rear of its slot carries a laterally extending pin, which pin is adapted to extend in the oppositely arranged slot of the other arm. The two cams 148 and 150 lie between the two oppositely extending pins 152 and 154. The pins being guided in the respective slots of the opposite arms in this way when the cams rotate, the cams will press the pins outwardly, the pins sliding laterally and horizontally in the slots. Inasmuch as each pin is connected to an arm, the rotation of the cams will simultaneously move the oppositely extending arms back and forth. The outer end of each arm carries a pin 464 and 466, respectively. Pin 466 is fastened on a crank arm 470 pivotally mounted on dial shaft 406. On the end of the crank arm 470 is a shutter 472 which is adapted in its arcuate reciprocation to cover and uncover the window 346. There are three of these shutters on the crank 470 to correspond to the three windows 346. In a similar manner the other shutter on the opposite side of the dial covers and uncovers the window 340. Thus in the operation of this device every time there is a shift in the indicating dial the shutter is automatically operated to cover the window so that the change is not viewable. The arms 462 and 464 have connected to them at the pins 466 and 468, springs 474 and 476 connected to the main frame 180 by a pin 475 which are for returning the arms to their inward position.

Reverting now to the driving mechanism and the calculating mechanism, and summarizing the operation, it will be seen that my improved computer clock is operated by the power of the motor 10 transmitted through a reducing gear and the flexible drive shaft 38, the selected speed of which is approximately 60 R. P. M.

When the pawl assembly shown in Figures 19 to 23 is rotated in one direction pawl 226 is brought into co-operation with ratchet 230. It will be seen by projecting one of the other lobes of the disc at various points in the path of travel of the pawl assembly the lobe will trip the pawl 226 into engagement with the ratchet 230, causing the latter to be advanced an adjustably variable number of predetermined spaces. The pawl is resorted to disengaged position by a stop plate 239 which is held rigidly by being mounted on shaft 102. The pawls have flat surfaces 241 which are engaged by co-operating stop plates 239 when the arms are returned to position by the spring 243. The springs are strong enough to cause surfaces 241 and plates 239 to withdraw the pawls from engagement with the ratchets against the action of springs 228 and place the pawls under control of the latches 232.

As the actuator 220 moves counter-clockwise it has at its opposite end a locking catch in the form of a shoulder 478 adapted to engage a shoulder 480 on a pivoted lever 482 whereby as the actuator revolves in a counter-clockwise direction it will be held in the position shown in Fig. 21 by the shoulder 480 engaging the catch 478 on the actuator 220. It is held in this position until the arm 134 which is rotating in a clockwise direction strikes a lug 484 on the lever 482 to disengage the catch on the actuator 220, whereupon the actuator by means of its spring 243 is returned to its initial position, as shown in Fig. 19.

The speed of shafts 38 and 90 is selected electively and not by way of limitation. The meter shaft 80 operates one revolution per gallon. As long as there is no flow of liquid through the meter the rollers 122 will remain stationary even though the motor is in operation and is driving the cylindrical housing 98. When liquid flows through the meter rotation movement will be imparted to the rollers to bring the clutch rolls into engagement with the cam shaped pockets, whereby to rotate the shaft 102. The ratio between the gears 130 and 132 is such that the clutch disc 98 will be rotated at 4 revolutions per gallon or the equivalent of one revolution per quart. Rotation of this clutch disc will cause the shaft 102 to be rotated by clutch member 100 in a 4 to 1 clutch ratio with the meter. The shaft 102 having the 3 radially disposed arms 134, 136 and 138 thereon rotates in such a way as to cause these arms to be alternately and continuously driven through a definite arc of travel once for each quart of liquid passing through the meter. The actuator arms of each set or bank are loosely mounted on the shaft 222 and after being actuated by the arms 134, 136 and 138 are returned to position by their springs 243. As hereinbefore described, movement of each actuator moves its corresponding pawl 226, which pawls are adapted to co-operate with the ratchets 230, 230' and 230" and fastened to the actuator 220 is another pawl 232 disposed to co-operate with radially projecting lobes 242 of the price-determining disc 246, 246' and 246".

value of both the 4th and 5th place decimals and this counter gear has 8 spaces instead of 10 and the gear is advanced 2 spaces for .00025, 4 spaces for .0005 and 6 spaces for .00075. In some localities gasoline is sold in ¼ and ¾ cent prices per gallon. By reducing these gallon prices to price per quart it will be noted that the result comes out in 6 decimal places and the combined 4th, 5th and 6th place is in ⅛ fractional sub-multiple division of the 3rd digit place. For example, the quart value of 12¼ cents per gallon is .03625, the last 3 decimals being ⅝ of the 3rd place decimal whole number. Thus to accumulate this value on the ¼ the first or 8 spaced counter wheel would be advanced 5 spaces, nothing would be recorded on the 10 cent counter wheel but the cent counter wheel which is a 10 division wheel, will be advanced 3 spaces. The first place decimal of the quarts value is always 0 so only 3 counter wheels are necessary to accumulate these values by addition of said value for each quart dispensed. Of the three accumulating counter wheels or gears used, the first (8 division) takes care of everything below the 3rd decimal place. The second wheel 10 division takes care of the third decimal place and the 3rd counter wheel (10 division) takes care of the 2nd decimal place which is full cents.

| Gal. | Qt. | Gal. | Qt. | Gal. | Qt. | Gal. | Qt. | Gal. | Qt. | Gal. | Qt. | Gal. | Qt. | Gal. | Qt. |
|---|---|---|---|---|---|---|---|---|---|---|---|---|---|---|---|
| 120 | .030 | 160 | .040 | 200 | .050 | 240 | .060 | 280 | .070 | 320 | .080 | 360 | .090 | 400 | .10 |
| 1 | .03025 | 1 | .04025 | 1 | .05025 | 1 | .06025 | 1 | .07025 | 1 | .08025 | 1 | .09025 | | |
| 2 | .0305 | 2 | .0405 | 2 | .0505 | 2 | .0605 | 2 | .0705 | 2 | .0805 | 2 | .0905 | | |
| 3 | .03075 | 3 | .04075 | 3 | .05075 | 3 | .06075 | 3 | .07075 | 3 | .08075 | 3 | .09075 | | |
| 4 | .031 | 4 | .041 | 4 | .051 | 4 | .061 | 4 | .071 | 4 | .081 | 4 | .091 | | |
| 5 | .03125 | 5 | .04125 | 5 | .05125 | 5 | .06125 | 5 | .07125 | 5 | .08125 | 5 | .09125 | | |
| 6 | .0315 | 6 | .0415 | 6 | .0515 | 6 | .0615 | 6 | .0715 | 6 | .0815 | 6 | .0915 | | |
| 7 | .03175 | 7 | .04175 | 7 | .05175 | 7 | .06175 | 7 | .07175 | 7 | .08175 | 7 | .09175 | | |
| 8 | .032 | 8 | .042 | 8 | .052 | 8 | .062 | 8 | .072 | 8 | .082 | 8 | .092 | | |
| 9 | .03225 | 9 | .04225 | 9 | .05225 | 9 | .06225 | 9 | .07225 | 9 | .08225 | 9 | .09225 | | |
| 130 | .0325 | 170 | .0425 | 210 | .0525 | 250 | .0625 | 290 | .0725 | 330 | .0825 | 370 | .0925 | | |
| 1 | .03275 | 1 | .04275 | 1 | .05275 | 1 | .06275 | 1 | .07275 | 1 | .08275 | 1 | .09275 | | |
| 2 | .033 | 2 | .043 | 2 | .053 | 2 | .063 | 2 | .073 | 2 | .083 | 2 | .093 | | |
| 3 | .03325 | 3 | .04325 | 3 | .05325 | 3 | .06325 | 3 | .07325 | 3 | .08325 | 3 | .09325 | | |
| 4 | .0335 | 4 | .0435 | 4 | .0535 | 4 | .0635 | 4 | .0735 | 4 | .0835 | 4 | .0935 | | |
| 5 | .03375 | 5 | .04375 | 5 | .05375 | 5 | .06375 | 5 | .07375 | 5 | .08375 | 5 | .09375 | | |
| 6 | .034 | 6 | .044 | 6 | .054 | 6 | .064 | 6 | .074 | 6 | .084 | 6 | .094 | | |
| 7 | .03425 | 7 | .04425 | 7 | .05425 | 7 | .06425 | 7 | .07425 | 7 | .08425 | 7 | .09425 | | |
| 8 | .0345 | 8 | .0445 | 8 | .0545 | 8 | .0645 | 8 | .0745 | 8 | .0845 | 8 | .0945 | | |
| 9 | .03475 | 9 | .04475 | 9 | .05475 | 9 | .06475 | 9 | .07475 | 9 | .08475 | 9 | .09475 | | |
| 140 | .035 | 180 | .045 | 220 | .055 | 260 | .065 | 300 | .075 | 340 | .085 | 380 | .095 | | |
| 1 | .03525 | 1 | .04525 | 1 | .05525 | 1 | .06525 | 1 | .07525 | 1 | .08525 | 1 | .09525 | | |
| 2 | .0355 | 2 | .0455 | 2 | .0555 | 2 | .0655 | 2 | .0755 | 2 | .0855 | 2 | .0955 | | |
| 3 | .03575 | 3 | .04575 | 3 | .05575 | 3 | .06575 | 3 | .07575 | 3 | .08575 | 3 | .09575 | | |
| 4 | .036 | 4 | .046 | 4 | .056 | 4 | .066 | 4 | .076 | 4 | .086 | 4 | .096 | | |
| 5 | .03625 | 5 | .04625 | 5 | .05625 | 5 | .06625 | 5 | .07625 | 5 | .08625 | 5 | .09625 | | |
| 6 | .0365 | 6 | .0465 | 6 | .0565 | 6 | .0665 | 6 | .0765 | 6 | .0865 | 6 | .0965 | | |
| 7 | .03675 | 7 | .04675 | 7 | .05675 | 7 | .06675 | 7 | .07675 | 7 | .08675 | 7 | .09675 | | |
| 8 | .037 | 8 | .047 | 8 | .057 | 8 | .067 | 8 | .077 | 8 | .087 | 8 | .097 | | |
| 9 | .03725 | 9 | .04725 | 9 | .05725 | 9 | .06725 | 9 | .07725 | 9 | .08725 | 9 | .09725 | | |
| 150 | .0375 | 190 | .0475 | 230 | .0575 | 270 | .0675 | 310 | .0775 | 350 | .0875 | 390 | .0975 | | |
| 1 | .03775 | 1 | .04775 | 1 | .05775 | 1 | .06775 | 1 | .07775 | 1 | .08775 | 1 | .09775 | | |
| 2 | .038 | 2 | .048 | 2 | .058 | 2 | .068 | 2 | .078 | 2 | .088 | 2 | .098 | | |
| 3 | .03825 | 3 | .04825 | 3 | .05825 | 3 | .06825 | 3 | .07825 | 3 | .08825 | 3 | .09825 | | |
| 4 | .0385 | 4 | .0485 | 4 | .0585 | 4 | .0685 | 4 | .0785 | 4 | .0885 | 4 | .0985 | | |
| 5 | .03875 | 5 | .04875 | 5 | .05875 | 5 | .06875 | 5 | .07875 | 5 | .08875 | 5 | .09875 | | |
| 6 | .039 | 6 | .049 | 6 | .059 | 6 | .069 | 6 | .079 | 6 | .089 | 6 | .099 | | |
| 7 | .03925 | 7 | .04925 | 7 | .05925 | 7 | .06925 | 7 | .07925 | 7 | .08925 | 7 | .09925 | | |
| 8 | .0395 | 8 | .0495 | 8 | .0595 | 8 | .0695 | 8 | .0795 | 8 | .0895 | 8 | .0995 | | |
| 9 | .03975 | 9 | .04975 | 9 | .05975 | 9 | .06975 | 9 | .07975 | 9 | .08975 | 9 | .09975 | | |

The accompanying chart shows prices per gallon from 12 cents to 40 cents by 1/10 of a cent and the corresponding value in quarts. Referring to the quart prices it will be noted that the 4th and 5th decimal places combine to make up items which are ¼ fractional divisions of the 3rd place digits. That is, the 4th and 5th places progress by repeating the figures 00, 25, 50 and 75 and then carry one into the 3rd decimal place. In order to meet this condition I have provided one counter gear 348, Figure 7, to accumulate the Referring to the drawings, it will be noted that the ratchet 230 has 40 teeth and is secured to the side of gear 348, which also has 40 teeth. The actuator 220 in the first bank is rotated by its co-operating arm 134 through an arc of travel of 72 degrees or the equivalent of 8 spaces of ratchet 230 and gear 264, shown in Figs. 24 and 25. In the second and third banks the actuator arms 220' and 220" are rotated through an arc of travel of 90 degrees or the equivalent of 10 spaces of their respective ratchets 230' and 230", and gears 376 and 386, respectively. The price-determining disc 246 in the first bank 200 has 5 radially projecting lobe spaces 72 degrees apart and the price-determining discs in the other two discs have 4 radially projecting lobe spaces 90 degrees apart. As hereinbefore stated, the shaft 260 is extended to the outside and is connected by means of chain gear to adjustable price-changing knob 66 by which the shaft is manually rotated in order to change the price. The shaft 260 has secured thereto the gear 262 which meshes with the full 40 tooth gear 264 in the first bank, the ratios between the gears 262 and 264 and between the sprockets 302 and 306 are such that when the right-hand price-indicating wheel 314 is rotated by the knob 66 one space, the price-determining lobe disc 246 in the first bank will be so positioned as to cause the pawl 226 to advance the ratchet teeth 230 a distance of two spaces even with the value .0025. Two spaces on the right-hand price-indicating wheel 314 would cause 4 spaces to be advanced on ratchet 230 or the value .005, 3 spaces on the right-hand price-indicating wheel 314 would cause 6 spaces to be advanced on ratchet 230 or the value .0075 the next time the value .0075 would change to .001. The transfer gear 266 which rotates with gear 264 would at that time engage gear 280 on the sleeve 282 having at its other end gear 284 which engages the 40 tooth price gear 286 and price-determining disc 246' in the second bank to be advanced one space, and so on. The result is that when any desired price per gallon is indicated on dial 314 by turning knob 66 the corresponding price per quart is already set up in the register. The locking pawls 488 co-operate with the price gears 264 (see Fig. 19) and insure the accurate positioning of the price-determining lobe disc 246. A shaft 490 having a collar with a flat side 492 is provided to lock the pawls 488 after any desired price change has been made. Movement of this shaft 490 is preferably under lock and key. However, I prefer to provide a knob or handle 68, Figures 6 and 18, mounted on an arm 496 pivoted on the shaft 490, this knob or handle 68 being accessible through the opening 58 when the door 60 has been opened, as has hereinbefore been described. The knob 68 is fastened to a plunger 498 which has a spring 500 adapted to keep the enlarged head of the plunger 498 in register with a hole in the frame 180. It will be seen, therefore, that rotation of the shaft 490 can only be accomplished by pulling out the plunger from the registering opening in the frame and revolving the arm 496 to a down position, as indicated in dotted line in Fig. 4, which will allow the flat portion of the collar 492 on shaft 490 to become adjacent to the locking lever 488 whereby the gears 264 will be released for rotation. In order to prevent the plunger 498 from being retracted and shifting of the arm 496 to the unlocked position, I provide an enlarged perforated head on the plunger 498 adapted to receive a seal 502 passed through the perforation in the end of the plunger so that it cannot be retracted unless the seal is broken. This locking or sealing means is so desired so that a change of price per gallon cannot be accomplished without breaking the seal.

The counter wheel assembly in each bank comprises a lobe carrying disc 246, 246' and 246", a full gear 348, 376 and 386, and a transfer gear 352 and 378. The transfer gear in the first bank transfers every 8th space, while the other two banks transfer every 10 spaces. The transfer from the 10th to cent is arranged to occur when $\frac{1}{10}$ of a cent has been accumulated. The counter transfer gear 352 co-operates with gear 354, loosely mounted on the shaft 356, which engages another gear 358 loosely mounted on a shaft 360 which engages another gear 362. Gear 362 drives a gear 374 through the ratchet and pawl clutch assembly, as shown in Fig. 8. The gear 374 meshes with full gear 376 in the second bank and thus the transfer is imparted. This transfer is duplicated by the 2d and 3rd banks. The cost of sale is indicated on the price dials and these dials have a capacity of $9.99 and will start from 0 upon a subsequent dispensing operation to compute the number of gallons delivered and the price thereof.

In the third bank, Figure 7, the transfer is imparted to gear 386 which is fixed to operate the gear 390. By referring to Figure 12, it will be seen that the gear 390 operates, through the various gear trains there disclosed, the cost indicating dials 418 and 448 which in turn operate the second and third order indicating dials through above described transfer mechanisms.

When a dispensing operation has been completed and the computing mechanism has registered on the clock face the amount of liquid dispensed and the total sale price of the complete amount, it is desirable and necessary to condition or reset and return the various mechanisms such as the total sale dials, clock hands and their respective operating members to their zero and initial positions, respectively, before another dispensing operation takes place. This resetting is accomplished automatically by the power of the pump motor driving or operating certain resetting mechanism which has been pre-conditioned by the completion of the previous dispensing operation.

Referring now to the drawings and in particular to Figs. 3, 4 and 5, it will be understood that at the end of the dispensing operation the control nozzle 28 is returned to its pocket in the side of the housing 2 and in order that the nozzle 28 will remain on its angularly disposed rest the door or closure must be lowered at least a certain distance in order to prevent the nozzle from sliding from its rest. This required distance is sufficient to cause the rack 70, which is attached to the upper part of the door, to revolve the gear 74 fixed to the reset shaft 76, see Fig. 3. Mounted on the reset shaft 76 is a radially extending arm 502 keyed to the shaft by pin 504. This arm 502 carries a pivoted pawl 506 adapted to engage a notched disc 508. This pawl 506, Figure 16, is urged against the periphery of the disc 508 by a spring 510 mounted on the radial arm 502. Upon rotation of the reset shaft 76 in a clockwise direction, see Fig. 15, the pawl 506 will engage one of two notches 510 and 512 on the periphery of the disc 508. Disc 508 is fast to a gear 514 by means of pins 516. The gear 514 in turn drives an idler gear 518 which is mounted on a stub shaft 520 journalled in the clock frame 180. This idler gear 518 in turn drives the gear 126 which carries the rollers 122. Rotation of this gear with its clutching connection with the clutch member 100 through the rollers 122 causes the shaft 102 that carries the arms 134, 136 and 138 to be rotated to their starting or initial position. This initial or starting position of these arms which has to be accurate and coincide with the other starting positions of the co-operating mechanisms, is determined by the adjustment of a stop pin 509 mounted on the frame 180, see Figs. 15 and 16. This stop pin is so located that it will engage the pawl 506 in the path of its arcuate rotation. Upon rotation of the reset shaft 76 the pawl 506 engages one of the notches 512 on the disc 508 and carries it to a position shown in Fig. 16, at which time the forward end of the pawl 206 will engage the pin 509 and prevent further rotation. This movement through the gearing described hereinbefore is sufficient to reposition the arms 134, 136 and 138 in accurate relative alinement with the actuating arms 220, 220′ and 220″, respectively.

The position the notches 512 on the disc 508 are in is due to the termination of the previous dispensing operation. The disc has two notches 180 degrees apart. The pawl 506 travels only 180 degrees, therefore, it will always engage one of the notches during its rotation. Upon the reverse rotation of the reset shaft 76, due to the opening of the door 72, the pawl 506 will return to its starting operation position, as shown in Fig. 15, and the end portion 511 on the pawl will engage the stop pin 513 and hold it out of engagement with the periphery of the disc 508 until another resetting operation occurs.

The rotation of the reset shaft, due to the closing of the door 72, also conditions a resetting roller clutch assembly mounted on the shaft 260. This resetting roller clutch assembly is constructed similar to the power roller clutch assembly on the shaft 102 (see Fig. 17) having similar rollers 524 disposed in angular pockets 525 of a clutch member 542, the clutch being keyed to the sleeve 580. A roller carrying disc 522, which carries the rollers 524, has on its periphery a notch 528 and is adapted to engage an extending arm 530, which is part of a lever 532 mounted and keyed to the shaft 534 (see Fig. 17). This lever 532 has a radially extending face 536 which engages a cam 538 mounted and keyed to the reset shaft 76. This cam 538 upon rotation of the reset shaft 76, will rotate the lever 532 and disengage the arm 530 from the notch 528 on the roller clutch disc 522. By releasing this arm 530 from the notch 528, the springs 540 in the roller clutch will tend to rotate the clutching member 542 and the roller disc 522 slightly in a counterclockwise direction so that the extending arm 530 of the lever 532 cannot engage the shoulder 528. This arm 532 under the tension of a spring 544 tends to engage the notch or the surface of the disc 530 except when the cam 538 on the reset shaft 76 cams it out of engagement. This releasing of the roller clutch takes place when the door 72 is lowered after the dispensing has taken place and the hose nozzle 28 has been returned to its pockets in the side of the frame or housing 2.

When another dispensing operation is desired, the hose 24 is pulled out to revolve the hose reel and to start the pump motor through the mechanism previously described. The starting of the pump motor 10 revolves the spiral gears 92 and 94. The gear 94 is connected to the sleeve 96 which has on its other end the gear 99, which in turn meshes with the idler gear 546 on the shaft 222. This gear 546 engages another gear 548 attached to the cup-shaped disc 549 of the roller clutch assembly, the roller clutch assembly being free to revolve due to the fact that the arm 530 has been disengaged from the notch 528 upon completion of the previous dispensing operation. The rotation of the clutch assembly 526 will rotate the gear 550 which is attached to the roller carrying disc 522. This gear 550 rotates another gear 552 fixed to the shaft 86 which has keyed thereto a spiral gear 554, see Fig. 9. This spiral gear 554 engages another spiral gear 556 on a shaft 558. This shaft 558 is parallel with the shaft 186 and has attached or fixed to it a pawl carrying disc 560. The pawl 562 pivotally mounted on the disc 560 is adapted to engage a notch 564 on a sleeve 566 which has at its other end a gear 568. This gear in turn meshes with another gear 570 on the clock hand operating shaft 186. This shaft 186 has on its outer end the fast moving hand 56 which will be rotated towards zero position by the rotation of the shaft 186. Shaft 186 is enabled to turn without moving the meter shaft 80 by reason of the friction clutch connection between shaft 186 and the gear 184.

Referring again to the shaft 558, it has on its outer end a spline or notch 578 adapted to operate a pawl 576, pivotally attached to the side of the gear 190. This gear 190 is attached to the sleeve 192, hereinbefore described, having on its opposite end the gear 194, which in turn engages the gear 196 to rotate the slow moving hand 54 on the sleeve 198. It will be understood upon rotation of the shaft 558 the slow and fast moving hands will be automatically returned to their zero position on the clock face.

When the clock hands have reached their zero position on the clock dial, the notch 528 again will be engaged by the arm 530 which will release the driving clutch connections between the rollers 524 and the cup-shaped housing 526, which will continue to rotate while the pump motor is operated.

Referring now to the resetting of the calculating mechanism, which is also operated by the power of the pump motor, I have provided the gear 550 which is attached to the side of the roller-carrying disc 522, see Fig. 7, which carries a sleeve 580 having at its opposite end another gear 582. Meshing with the gear 582 is a larger gear 583 loosely mounted on shaft 222, which in turn drives a gear 584 fixed to the shaft 372. This shaft has on its surface a series of splines or notches 586, see Fig. 8, adapted to engage or co-operate with the spring pressed pawls 588. These pawls and spring assemblies are loosely mounted in cut-out spaces in the body portion of a series of gears 590, 592 and 594, which are mounted on the shaft 372. Upon rotation of the shaft 372 by the gear 582 and 584 described, and the power of the pump motor 100, the notches 586 will rotate the gears 590, 592 and 594 through their respective pawl connections to revolve the resetting gears 348, 376 and 386, loosely mounted on the sleeves 268, but drivingly connected to their respective ratchets 230, 230′ and 230″ and Geneva gears. In this manner this mechanism is set to its initial or starting position before another dispensing operation takes place.

At the finish of a dispensing operation the total price dials 419, 430 and 432, viewable through the window or opening 344 on one side of the pump and the dials 448, 450 and 452, viewable through the windows 346 on the other side of the pump have to be reset or set ahead to the three zero positions. This resetting is accomplished simultaneously with the resetting of the calculating mechanism just described and also derives the power for resetting from the pump motor 110. Referring to Figs. 7 and 12, the gear wheel 583 on said 222 has meshing engagement with the smaller gear 582. This gear 583 engages oppositely disposed trains of gearing to drive and reset the cost of sale dials. It will be seen in Fig. 12 the gear 583 also meshes with the small gear 584 which in turn meshes with another gear 586 which in turn drives a gear 588 fixed to the dial shaft 406. This shaft 406 has on its surface a series of splines 590, Figures 13 and 14, adapted to engage spring-pressed pawls 592 rotatably mounted in the body of the ratchets 412 which are disposed in each of the dial units 419, 430 and 432. Upon rotation of the shaft 406 the splines 590 will rotate the dial through the pawl connection to set them to zero position. The mechanism for resetting of the dials on the opposite side of the pump is duplicated, the spline shaft 406' being driven through the gearing 594, 595 and gear 596 fastened to the shaft 406'.

Referring now to Figs. 17 and 18, it will be noted that fixed to the shaft 534 is an arm 597 having a link 598 attached thereto. This link at its opposite end is pivotally connected to another arm 600, pivotally mounted on the shaft 372. This arm has an angular should so positioned to lock the gear 454 that controls the money-totalizer gear 458 from rotation. This locking of the money-totalizer is necessary during the resetting so that the rotation of the gears in the money accumulator will not be registered on the money totalizer. This locking mechanism is released when the arm 530 is allowed to enter the notch 228 which allows the shaft 534 to rotate due to the tension of the spring 544 and the release of the cam 538, whereby link 598 will remove the lever 600 out of engagement with the gear 554, as shown in Fig. 18.

I also provide means for locking the resetting mechanism while changing the price per gallon.

Referring to Figs. 6 and 18, an arcuate slot 602 is formed in the resetting arm 532 and a rod 604 having a pivoted connection with the locking arm 496 at one end and at the other end a right angle bend adapted to reciprocate in slot 602. When the locking arm is in a down position or the position it is manually moved to while the price per gallon is being changed, the rod 604 has its lower end engaging the bottom portion of the slot 602 thereby preventing the rotation of the resetting shaft and the unlocking of the arm 530 from the notch 528. The purpose of this locking means is to prevent shifting of the various mechanisms while the price per gallon is being changed. The price locking arm 488, hereinbefore described, has at its upper end a spring connection to a lever 606 which by an action of the spring 608 forms a ratchet connecting with the gear 590 on shaft 372, the purpose being to accurately position the gears and prevent overrunning due to speed in operation.

With the completion of the dispensing operation and the final lowering of the door 72 to actuate the resetting shaft and conditioning the resetting mechanism, hereinbefore described, it is desirable to tightly seal the meter valve 16 against its valve seat 15. This is accomplished by a cam disc 610 fixed to the end of the reset shaft 76. This cam engages a cam lever 612 rigidly fixed to the meter controlled shaft 47. This shaft has fixed to its end a bifurcated arm 614 which is adapted to engage, by means of studs 616, the groove of a collar 618 which is free to slide on the valve rod 19. Interposed between this collar 618 and adjusting nuts 620 is a tension spring 622. Upon slight rotation of the shaft 47 due to the action of the cam 610, the spring 622 which is placed under tension by the collar 618 will tend to raise the valve rod 19 and tightly seal the meter valve against the seat 15. This completes the resetting and conditioning of the pump for the next dispensing operation.

With reference to Figs. 28, 29, 30, and 31 of the drawings, I provide a modified computing mechanism as shown. As far as the ultimate result obtained there is no difference between this construction and that hereinbefore described. The fundamental difference in the modified development is the counter actuating pawls which have a continuous rotating movement instead of a reciprocating movement like the pawls 226 hereinbefore described. This continuous rotating movement secures a smoother operating mechanism.

In this modified construction the radially extending arms 134, 136 and 138 are replaced by the spur gears 624 mounted on the shaft 622. The pawl carrying arm 220 is replaced by an arm 626 having a spur gear 628 attached thereto and meshing with the gear 624 on shaft 222. This construction causes the counter actuating pawl 630 to make one complete revolution for every quart of liquid dispensed. This pawl 630 is provided with a right angle portion 632 which engages a stationary cam 634. This cam is so designed to permit the pawl 630 to be operable only a certain portion of its rotation. The method of selecting the price changing is identical with the mechanism hereinbefore described. This mechanism consists of a lobe disc 636 positioned radially to unlatch the pawl by means of the latch member 638 pivoted on the stationary cam 634 by the pin 635. This unlatching occurs at some point during the arc A of the cam 634 and the remaining portion of the cam 634 causes the pawl 630 to be moved out of operating engagement with the ratchet.

The operating portions of the cams 634 are arranged in different radial relation to each other so as to cause the pawls 630 of the various orders to operate in sequence, the same as are hereinbefore described. It will be seen therefore that an intermittent movement is imparted to the counter mechanism which occurs in sequence from the lower to the higher orders and the only difference is the structural modification shown in Fig. 29, which is a substitution of a rotary motion for the reciprocating movement of the pawls 226.

The remaining construction of the counter mechanism, which includes Geneva and accumulating gears, is shown in Fig. 29 and is identical with the hereinbefore described counter mechanisms.

*Summary of operation*

To properly describe the cycle of operation of the device, it is necessary to revert to the final operation of the preceding cycle which is the operation of closing the door 72.

As will be seen from Figure 3, this motion of the door causes a rotation of shaft 76 to which are attached the cam 538 and the pawl mechanism 502.

The rotation of the cam 538 by the closing of the door effects an operation of lever 532 (Figures 17 and 18) in a counterclockwise direction with the result that the pawl 530 is withdrawn and withheld from engagement with the reset clutch and the clutch is conditioned for operation. The control plate 542 of the clutch is moved by springs 540 so that when the pawl 538 is subsequently released as the door 72 is opened, the clutch will remain engaged.

Rotation of lever 502 as the door is closed causes rotation of gear 514 whose motion is transmitted by means of idler 518 to gear 126 which is attached to shaft 102. Since the shaft 102 is thus brought to a predetermined position, the computer actuators 134, 136 and 138 will occupy a predetermined position at the start of an operation.

It is to be noted that this mechanism is effective only in case the dispensing operation has been terminated by snapping the nozzle closed, in which case the computer actuators will occupy a position other than that determined by disc 156 and pawl 160 (Figure 3). If the operation has been terminated in the normal manner as will be described, this portion of the reset mechanism will not function because the notch 512 will not be engaged by pawl 506 and consequently the latter will ride idly over the periphery of disc 508 (see Figures 3, 15 and 16).

Assuming that a price of 16.3¢ a gallon has been set upon the dials 314, 316 and 318 (Figure 6), to dispense gasoline, it will be necessary for the operator to raise the door 72 (Figures 1 and 3) so as to release the nozzle from the nozzle socket and in so doing, the cam 538 is rotated away from lever 532 to free the latching lever 530 for return toward holding relation with respect to the reset clutch (Figure 17). Thus, the resetting mechanism is automatically conditioned by the operator's act of securing the nozzle for stopping the resetting operation when resetting is complete.

To insure that this resetting of shaft 102 will be complete, it is necessary that the door be fully raised and accordingly the notched disc 610 on shaft 176 (Figure 3) is utilized to prevent operation of the switch and control valve until the notch of the disc occupies a predetermined position with respect to finger 612 which is connected to be actuated toward the disc by the switch and valve mechanism as the latter moves toward or from operated position. The disc occupies this position only when the door is in its fully raised position.

Thus, the first operation of the new cycle is the opening of door 72 which rotates the shaft 76 in the opposite direction to recondition pawl 502—506 for a succeeding operation and back cam 538 in a reverse direction to release lever 532 thus permitting spring 544 to bring pawl 538 into operative relation with respect to the reset clutch so that it will disable the clutch after one revolution.

As the operator approaches the customer's receptacle he pulls on the hose 24 to unwind it from reel 6 and the pins in the side of the reel operate mechanism 50 to open the control valve and actuate the switch 40 to the "on" position (Figure 3). Latch 175 retains the parts in operated position and thus the motor is energized and continues to run. The reel is latched against return by mechanism 50 and latch 175 (Figure 3).

The operation of the motor serves to rotate shaft 90 (Figure 9) and through the train of gears 92, 94, 99, 546 and 548, it actuates the reset clutch which was conditioned for operation during the closing of door 72 at the end of the preceding operation as described above. Gear 550 of this clutch drives gear 552, shaft 86, gears 554 and 556, shaft 558, gears 568, 570 and 194, 196 to reset the hands 56 and 54, respectively, to zero. The meter shaft 80 is not affected due to the slip clutch connection between it and shaft 186.

Gear 550 which is operated by power, as described above, also drives a sleeve 580 (Figure 7) and by means of gears 582, 583 (Figure 12), 584, 585, 586 and shaft 406 resets one bank of cost register dials and by means of gears 583, 584, 586, 588 and shaft 406 resets the second bank of cost register dials.

After the reset clutch has made one revolution, which is sufficient to reset all of the indicators described above, it will be disengaged by arm 530 but the motor will continue to run. The apparatus is now in condition for making a delivery of gasoline.

This is accomplished by opening the nozzle valve which results in rotation of the meter shaft 80 and gears 82 and 182 (Figure 9). The fractional gallons hand 56 is driven directly by gear 182 through gear 184 and shaft 186 while the gallons hand 54 is driven through the reduction gearing 188, 190, 194 and 196.

The control element of register driving clutch 126 (Figure 9) is driven through gears 130, 132 and 84 from meter shaft gear 82 and thus has a travel which is in direct proportion to the travel of the meter, and the shaft 102, which is keyed to driven element 100 of the clutch, is power driven in direct proportion to the travel of the meter. The gearing is so calculated that for one quart dispensed by the meter, the shaft 102 will be rotated one revolution.

Arms 134, 136 and 138 on shaft 102 are spaced 120° apart and each arm cooperates with one order of computing mechanism shown in Figures 7 and 19. Arm 134 cooperates with the primary order shown to the right in Figure 7; arm 136 actuates the secondary order shown in the center; and arm 138 actuates the tertiary order shown at the left in said figure.

The mechanism of each order comprises the elements shown in Figure 19 which are a pawl carrier such as 220 having a pawl 226. The pawl carrier is adapted to be actuated by arm 134 and in turn it advances a ratchet 230 and a gear 348 fixed thereto. The amount by which the ratchet is advanced is governed by the setting of cam 246 which trips the pawl into engagement with the ratchet at a point determined by the price setting so that the ratchet will partake of the movement of the pawl during the remainder of its stroke.

Thus, each of the computing orders is advanced by the arms 134, 136 and 138 a predetermined amount during each rotation of the shaft 102.

In addition each order is tied in with its adjacent superior order by means of a transfer mechanism so that after the inferior order has accumulated a predetermined number of value increments, this accumulation will be transferred to the superior order independently of the ratchet mechanism of the superior order. Thus, the first and second orders are connected by gears 352, 354, 356, 362, 374 and 376, the latter gear being connected with ratchet 230' and gear 378 so that for every predetermined accumulation on the primary order, this accumulation will be transferred to the secondary order elements 230' and 378.

This accumulation plus the accumulation of the secondary order will be transferred to the tertiary order by gears 378, 379, 384 and 386, the latter gear being connected with ratchet 230" and final gear 390.

The gear 390 of the tertiary mechanism is thus given a travel which is the combined travels of the three orders, and in turn drives the one cent wheels 419 and 448 of the cost registers shown in Figure 12 by means of gears 392, 396, 398, 402 and 443, 444, respectively. A cumulative cost register 64 is also driven by this gear 390.

The transfers between the cents, dimes and dollars dials of the cost registers are the usual ten to one transfers so that as ten one cent increments are added to the first dial, it will return to zero and advance the adjacent dial one unit representing ten cents.

The price change mechanism shown in detail in Figures 5, 6 and 7 comprises an actuating knob 66 which is geared to rotate the price change gear 264 of the primary order computing mechanism and also the one tenth cent wheels 314 of the visual price indicators (Figures 5 and 6.)

Referring to Figure 7, the ratchet tripping cam 246 of the first order is connected to move with gear 264 which is adjusted by the knob 66 as just described and since the motion of this cam is the same as that of the one tenth cent price indicator 314 (Figure 6), the numeral on this indicator which appears before window 320 will represent the setting of the cam.

The gear 264 is connected to operate a gear 266 which through transfer gears 280, 284 and 286 is adapted to set the cam 246 of the secondary order mechanism which is fixed to rotate with gear 286.

Similarly gear 292 of the secondary order is adapted to actuate by means of transfer mechanism comprising gears 294, 298 and 300 the cam 246" of the tertiary order which is fast to gear 300.

The one tenth cent dials 314 of the price indicators are connected through transfer mechanisms 332 (Figure 6) to advance the one cent dials. Similar transfer mechanisms 336 enable the one cent dials to advance the ten cent dials.

The price indicators thus are adapted to indicate the price of a gallon of liquid to be dispensed in ten cents, cents and tenth cents while the computing mechanism is adapted to compute at the price of a quart of fluid. Thus while the price per gallon may be .163 dollar the computer is accumulating the quart price of .04075 dollar for each revolution of shaft 102 (Figure 9).

As will be seen by an inspection of column two of the table on page 6, as the price per gallon increases in one-tenth cent or .001 dollar increments, the price of the quart advances by increments of .025 cent or .00025 dollar increments, accordingly the ratio of the gearing between shaft 260 and the cam 246 and between said shaft and the price indicator dial 314 must be such that as a lobe 242 on the cam advances one-fourth of the stroke of the ratchet, the one-tenth cent indicator dial will advance one-tenth of a revolution.

Thus, at the price of 16.3¢ per gallon assumed above, the primary order mechanism will be advanced .075 cent or .00075 dollar or three-fourths of the stroke of the ratchet for each quart of liquid metered.

The secondary order computing mechanism accumulates value in increments of one tenth cent or .001 dollar and the active lobe 242 of the cam 246' in the secondary order mechanism may be adjusted to any one of ten positions throughout the range of the stroke of its ratchet.

Similarly the tertiary order computing mechanism accumulates value in increments of one cent or .01 dollar and the active lobe 242 of cam 246" may assume any one of ten positions throughout the stroke of its ratchet. As described above the tertiary accumulator is connected to the one cent wheel of the cost register.

The transfer mechanism between the primary and secondary order price adjusting cams is such that as the active lobe of the primary order cam passes out of the range of operation of its pawl, the active lobe of the secondary order cam will be advanced one step. Of course, a similar transfer ratio obtains between the secondary and tertiary order cams.

The transfer gearing between the one-tenth cent, one cent and ten cent price indicating wheels is designed for operation similar to that described in connection with the cams so that the price indicated by the price dials will accurately indicate the setting of the control cams.

Since the computed price can be correct only at the time that a quart increment has been completely dispensed, a shutter 470 (Figures 5 and 6) covers up the cost indicator dials except at the time when the indication is correct. Actuation of the shutter to open position is effected by the cams 148 and 150 on shaft 152 (Figures 5 and 9).

In order to insure that the dispensing operation will be stopped exactly at the end of a quart increment, the notched disc 156 (Figure 3) on shaft 102 holds pawl 160 out of its home position except at the quart position and consequently the switch is held closed and the control valve is held open until a full quart has been dispensed.

Termination of the operation is effected by the operator who snaps the nozzle valve shut at any time after delivery of the final quart is begun. This action causes impact pressure to be created in the line and effects the collapse of the bellows 174 and the release of latch 175. This permits the valve 16 to partially close and complete closure of the valve and opening of the motor switch is effected when pawl 160 engages the notch in disc 156.

The release of the latch 175 also permits bar 48 (Figure 3) to rise and unlatch the reel 6 so that the hose may again be reeled up.

Upon rotation the nozzle to the compartment and lowering the door 72, the shaft 76 is rotated as described above. The cam face of the disc 610 engages lever 612 of the switch mechanism and locks the switch and tensions the relief spring 622.

Should the operator desire to change the price setting, he would open the door 60 in the upper portion of the housing (Figure 2), break seal 502, pull out on knob 68 and pull down the lever to unlock the price setting mechanisms and to lock the lever 532 against operation. Meanwhile the knob 66 may be rotated in a suitable direction to set up the new price simultaneously on the price indicator dials and the computing control cams. Upon return of the knob 68 to its normal position, the price setting mechanism is again locked by pawl 488 (Figure 17) and the lever 532 is released so that another dispensing cycle may be started.

Having thus described my invention what I claim as new and desire to secure by Letters Patent is:

1. In a liquid dispensing device, the combination of means including a hose forming a liquid flow line, a pump for forcing liquid through said line, an electric motor for operating said pump, means operated as an incident to the movement of the hose for energizing said motor, a register mechanism, resetting mechanism for the register mechanism, and means for connecting said resetting mechanism to said motor at the end of a dispensing operation so that the initial movement of said motor in the succeeding dispensing operation will be transmitted to the resetting mechanism.

2. In a liquid dispensing device, the combination of means forming a liquid flow line, a pump for forcing liquid through the line, a register, resetting mechanism therefor, an electric motor for the pump, means for starting the motor and means for automatically actuating the resetting mechanism from said motor preliminary to a dispensing operation.

3. In a liquid dispensing device, a register mechanism, computing mechanism for the register mechanism, resetting mechanism for the register mechanism, means for actuating the resetting mechanism, means for adjusting the computing mechanism to vary its computing rate, and means for locking the resetting mechanism and for unlocking the adjusting means during any change of adjustment in the computing mechanism.

4. In a liquid dispensing device, the combination of a liquid flow line comprising a hose terminating in a nozzle, supporting means for said nozzle, a register having a zero indicating position and adapted to be driven therefrom in accordance with the flow of liquid in said line, means for resetting said register to zero indicating position, power means for operating said resetting means and means operated as an incident to the return of the nozzle to its support for conditioning the resetting means for operation by said power means said conditioning means being operable upon removal of the nozzle from said support for limiting the operation of said resetting means.

5. In a liquid dispensing device, the combination of a liquid flow line comprising a hose terminating in a nozzle, a storing device adapted for movement to yield or retrieve said hose, supporting means for said nozzle, a register having a zero indicating position and adapted to be driven therefrom in accordance with the flow of liquid in said line, means for resetting said register to zero, power means for operating said resetting means, means operable as an incident to the return of the nozzle to its support to condition the resetting means for operation by the power means, and means operable by said storing device in yielding said hose for starting said power means.

6. In a liquid dispensing apparatus, the combination of a liquid flow line comprising a hose terminating in a nozzle, supporting means for said nozzle, a register having a zero indicating position and adapted to be driven therefrom in accordance with the flow of liquid in said line, means for resetting said register to zero, power means for operating said resetting means, means operable as an incident to the replacement of said nozzle on its support for conditioning the resetting means for operation by said power means and means operable thereafter for starting said power means.

7. In a liquid dispensing apparatus, the combination of a liquid flow line comprising a hose terminating in a nozzle, a support for said nozzle adapted to eject said nozzle therefrom, means movable to a position for retaining said nozzle on said support, a register having a zero indicating position and adapted to be driven therefrom in accordance with the flow of liquid in said line, means for resetting said register to zero indicating position, power means, and means operable by said nozzle retaining means to connect said power means to drive said resetting means.

8. In a liquid dispensing apparatus, the combination of a liquid flow line comprising a hose terminating in a nozzle, a support for said nozzle adapted to eject said nozzle therefrom, means movable to a position for retaining said nozzle on said support, a register having a zero indicating position and adapted to be driven therefrom in accordance with the flow of liquid in said line, means for resetting said register to zero indicating position, power means, and means operable by said nozzle retaining means as it is moved to nozzle retaining position to connect said power means to drive said resetting means said connecting means being conditioned upon movement from nozzle retaining position to disconnect said power and resetting means after a predetermined operation thereof.

9. In a liquid dispensing apparatus, the combination of a liquid flow line comprising a hose terminating in a nozzle, a support for said nozzle adapted to eject said nozzle therefrom, means movable to a position for retaining said nozzle on said support, a register having a zero indicating position and adapted to be driven therefrom in accordance with the flow of liquid in said line, means for resetting said register to zero indicating position, power means, means operable by said nozzle retaining means to connect said power means to drive said resetting means and means operable by movement of said hose to effect the actuation of said power means.

10. In a liquid dispensing apparatus, the combination of a liquid flow line, a hose terminating in a nozzle, means for supporting said nozzle when it is not in use, a register having a zero indicating position and adapted to be driven therefrom in accordance with the flow of liquid in said line, means for resetting said register to zero indicating position, power means, hose storing means mounted for movement to yield or retrieve said hose, means operable by movement of said hose storing means to energize said power means, and means operated as an incident to the manipulation of the nozzle supporting means for connecting said resetting means for operation by said power means.

11. In a liquid dispensing apparatus, the combination of a liquid flow line, a hose terminating in a nozzle, means for supporting said nozzle when it is not in use, a register having a zero indicating position and adapted to be driven therefrom in accordance with the flow of liquid in said line, means for resetting said register to zero indicating position, power means, hose storing means mounted for movement to yield or retrieve said hose, means operable by movement of said hose storing means to energize said power means, means including a clutch for connecting said power means to operate the resetting means, and means operable as an incident to the manipulation of the nozzle support for rendering said clutch effective.

12. In a liquid dispensing apparatus, the combination of a liquid flow line, a hose terminating in a nozzle, means for supporting said nozzle when it is not in use, a register having a zero indicating position and adapted to be driven therefrom in accordance with the flow of liquid in said line, means for resetting said register to zero indicating position, power means, hose storing means mounted for movement to yield or retrieve said hose, means operable by movement of said hose storing means to energize said power means to operate the resetting means, means operable as an incident to the placing of the nozzle on its support for rendering said clutch effective and means conditioned by removal of the nozzle from its support for rendering said clutch ineffective after a predetermined operation of the power means.

13. In a liquid dispensing apparatus, the combination of a liquid flow line, a hose terminating in a nozzle, means for supporting said nozzle when it is not in use, a register having a zero indicating position and adapted to be driven therefrom in accordance with the flow of liquid in said line, means for resetting said register to zero indicating position, power means, hose storing means mounted for movement to yield or retrieve said hose, means operable by movement of said hose storing means to energize said power means, means for maintaining said energizing means in operated condition, and means operated as an incident to the removal of the nozzle from its support for conditioning said resetting means for a predetermined operation by said power means.

14. In a liquid dispensing apparatus, the combination of a liquid flow line, a hose terminating in a nozzle, means for supporting said nozzle when it is not in use, a register having a zero indicating position and adapted to be driven therefrom in accordance with the flow of liquid in said line, means for resetting said register to zero indicating position, power means, hose storing means mounted for movement to yield or retrieve said hose, means operable by movement of said hose storing means to energize said power means, means for maintaining said energizing means in operated condition, means operated as an incident to the manipulation of the nozzle support for connecting said resetting means for operation by said power means, and means for disconnecting said resetting and power means after a predetermined operation of said resetting means.

15. In a liquid dispensing apparatus, the combination of a liquid flow line, a hose terminating in a nozzle, means for supporting said nozzle when it is not in use, a register having a zero indicating position and adapted to be driven therefrom in accordance with the flow of liquid in said line, means for resetting said register to zero indicating position, power means, hose storing means mounted for movement to yield or retrieve said hose, means operable by movement of said hose storing means to energize said power means, means for maintaining said energizing means in operated condition, means operated as an incident to the removal of the nozzle from its support for connecting said resetting means for operation by said power means, means for automatically disconnecting said resetting and said power means after a predetermined operation of said resetting means and means operable from the nozzle end of the hose for releasing said maintaining means.

16. In a liquid dispensing device, the combination of means forming a liquid flow line comprising a hose, hose storing means mounted for movement to yield or retrieve said hose, a register having a zero indicating position and adapted to be driven therefrom in accordance with the flow of liquid in said line, means for resetting said register to zero, and means operated by movement of said hose storing means as it moves to yield said hose for actuating said resetting means, said actuating means comprising a switch, a power mechanism controlled thereby and means for connecting said power mechanism with said resetting means.

17. In a liquid dispensing apparatus, the combination of means forming a liquid flow line, means for supplying a flow of liquid to said line, a cost register, a computing mechanism for said register adapted to be driven in accordance with the flow of fluid in said line and adapted to be adjusted to vary the rate at which computation is effected, adjusting means for said computing mechanism, means movable to lock said adjusting means in adjusted position, means operable to control said flow supplying means, means movable to lock said controlling means against operation and means interconnecting said locking means so that movement of one locking means to unlocking position will be accompanied by movement of the other locking means to locking position.

WILLIAM M. CARROLL.